(12) United States Patent
Iwase et al.

(10) Patent No.: US 11,373,635 B2
(45) Date of Patent: Jun. 28, 2022

(54) INFORMATION PROCESSING APPARATUS THAT FADES SYSTEM UTTERANCE IN RESPONSE TO INTERRUPTION

(71) Applicant: Sony Corporation, Tokyo (JP)

(72) Inventors: Hiro Iwase, Kanagawa (JP); Shinichi Kawano, Tokyo (JP); Yuhei Taki, Kanagawa (JP); Kunihito Sawai, Kanagawa (JP); Masaki Takase, Tokyo (JP); Akira Miyashita, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/959,680

(22) PCT Filed: Oct. 26, 2018

(86) PCT No.: PCT/JP2018/039825
§ 371 (c)(1),
(2) Date: Jul. 2, 2020

(87) PCT Pub. No.: WO2019/138651
PCT Pub. Date: Jul. 18, 2019

(65) Prior Publication Data
US 2021/0035554 A1 Feb. 4, 2021

(30) Foreign Application Priority Data

Jan. 10, 2018 (JP) .............................. JP2018-002162

(51) Int. Cl.
*G10L 15/26* (2006.01)
*G10L 15/04* (2013.01)
(Continued)

(52) U.S. Cl.
CPC ............... *G10L 15/04* (2013.01); *G06F 3/16* (2013.01); *G10L 13/02* (2013.01); *G10L 15/222* (2013.01)

(58) Field of Classification Search
None
See application file for complete search history.

(56) References Cited

U.S. PATENT DOCUMENTS 5,576,955 A * 11/1996 Newbold .............. G06F 40/232
715/219
6,144,938 A * 11/2000 Surace .................. G10L 13/033
704/257
(Continued)

FOREIGN PATENT DOCUMENTS

JP 5-323993 A 12/1993
JP 8-146991 A 6/1996
(Continued)

OTHER PUBLICATIONS

International Search Report and Written Opinion dated Jan. 8, 2019 for PCT/JP2018/039825 filed on Oct. 26, 2018, 9 pages including English Translation of the International Search Report.

*Primary Examiner* — Jakieda R Jackson
(74) *Attorney, Agent, or Firm* — Xsensus LLP

(57) ABSTRACT

An apparatus and method are capable of controlling the output of the system utterance upon the occurrence of barge-in utterance and enabling a smooth interactive between a user and the system. Fade processing is applied to lower at least one of volume, a speech rate, or a pitch (voice pitch) of system utterance from a starting time of the barge-in utterance acting as the user interruption utterance during executing the system utterance. Even after the completion of the fade processing, the output state upon completing the fade processing is maintained. In a case where the system utterance level is equal to or less than the predefined threshold during the fade processing, the system utterance is displayed on a display unit. One of stop, continuation, and rephrasing is executed based on an inten- (Continued)

tion of the barge-in utterance and whether an important word is included in in the system utterance.

17 Claims, 14 Drawing Sheets

(51) Int. Cl.
*G06F 3/16* (2006.01)
*G10L 13/02* (2013.01)
*G10L 15/22* (2006.01)

(56) References Cited

U.S. PATENT DOCUMENTS

| | | | |
|---|---|---|---|
| 7,499,969 B1* | 3/2009 | van Os | H04M 3/56 709/203 |
| 8,526,940 B1* | 9/2013 | Chowdhary | H04W 24/08 455/425 |
| 8,898,063 B1* | 11/2014 | Sykes | G06Q 40/04 704/270 |
| 9,268,858 B1* | 2/2016 | Yacoub | G06F 16/24573 |
| 10,127,731 B1* | 11/2018 | Ozery | G01S 5/22 |
| 10,146,789 B1* | 12/2018 | Lakshmanan | G06F 16/178 |
| 10,529,326 B2* | 1/2020 | Landry | G06F 3/167 |
| 10,898,999 B1* | 1/2021 | Cohen | B25J 9/0003 |
| 2003/0055519 A1* | 3/2003 | Goldberg | G01S 11/02 700/94 |
| 2003/0061043 A1* | 3/2003 | Gschwendtner | G10L 15/08 704/254 |
| 2003/0083874 A1* | 5/2003 | Crane | G10L 15/222 704/246 |
| 2004/0228463 A1* | 11/2004 | Sauvage | H04M 3/428 379/202.01 |
| 2004/0264652 A1* | 12/2004 | Erhart | G10L 15/26 704/E15.045 |
| 2005/0021341 A1* | 1/2005 | Matsubara | G10L 15/07 704/275 |
| 2006/0247931 A1* | 11/2006 | Caskey | G10L 15/22 704/E15.04 |
| 2007/0072647 A1* | 3/2007 | Mousseau | G06F 3/0237 455/564 |
| 2007/0203701 A1* | 8/2007 | Ruwisch | G10L 15/187 704/E15.009 |
| 2008/0005656 A1* | 1/2008 | Pang | G09B 5/062 715/203 |
| 2008/0015846 A1* | 1/2008 | Acero | G10L 25/78 704/201 |
| 2008/0147407 A1* | 6/2008 | Da Palma | G10L 15/22 704/260 |
| 2009/0112599 A1* | 4/2009 | Ljolje | G10L 15/222 704/270 |
| 2009/0254342 A1* | 10/2009 | Buck | G10L 25/78 704/233 |
| 2010/0168883 A1* | 7/2010 | Wada | G10L 19/005 700/94 |
| 2011/0301728 A1* | 12/2011 | Hamilton | G11B 27/30 700/94 |
| 2012/0116550 A1* | 5/2012 | Hoffman | A63B 71/0622 700/91 |
| 2012/0117185 A1* | 5/2012 | Cassidy | G06F 16/4387 709/217 |
| 2012/0166188 A1* | 6/2012 | Chakra | G10L 15/26 704/226 |
| 2013/0158984 A1* | 6/2013 | Myslinski | G06Q 30/0241 704/9 |
| 2013/0185057 A1* | 7/2013 | Yoon | G09B 19/06 704/9 |
| 2013/0202097 A1* | 8/2013 | Schultz | H04M 11/08 379/93.17 |
| 2014/0067367 A1* | 3/2014 | Simmons | G10L 15/005 704/8 |
| 2014/0095464 A1* | 4/2014 | Masuda | G06F 16/951 707/706 |
| 2014/0120502 A1* | 5/2014 | Prince | G09B 5/062 434/157 |
| 2014/0156539 A1* | 6/2014 | Brunet | G06Q 30/01 705/304 |
| 2014/0188461 A1* | 7/2014 | Myslinski | A63F 13/00 704/9 |
| 2014/0287779 A1* | 9/2014 | O'Keefe | H04W 4/024 455/456.3 |
| 2014/0334732 A1* | 11/2014 | Jung | G06F 3/04845 382/188 |
| 2015/0047495 A1* | 2/2015 | Neitzke | G10H 1/18 84/609 |
| 2015/0061971 A1* | 3/2015 | Choi | G06F 3/1454 345/2.3 |
| 2015/0181306 A1* | 6/2015 | Innes | H04N 21/4126 725/74 |
| 2016/0048489 A1* | 2/2016 | Miyashita | G06F 40/166 715/271 |
| 2016/0133257 A1* | 5/2016 | Namgoong | G06F 3/16 704/235 |
| 2016/0155435 A1* | 6/2016 | Mohideen | G10L 15/30 704/235 |
| 2016/0210013 A1* | 7/2016 | Park | G06F 3/0488 |
| 2017/0043713 A1* | 2/2017 | Sun | B60Q 5/00 |
| 2017/0048490 A1* | 2/2017 | Martinez | H04N 5/76 |
| 2017/0133007 A1* | 5/2017 | Drewes | G10L 15/22 |
| 2017/0149969 A1* | 5/2017 | Mockus | H04M 3/5108 |
| 2017/0154637 A1* | 6/2017 | Chu | G09B 21/006 |
| 2017/0201613 A1* | 7/2017 | Engelke | G10L 15/06 |
| 2017/0243582 A1* | 8/2017 | Menezes | G10L 13/033 |
| 2017/0256258 A1* | 9/2017 | Froelich | H04N 7/157 |
| 2017/0256261 A1* | 9/2017 | Froelich | G10L 15/02 |
| 2017/0277257 A1* | 9/2017 | Ota | G06F 1/163 |
| 2017/0293611 A1* | 10/2017 | Tu | G06F 3/0482 |
| 2018/0067641 A1* | 3/2018 | Lerner | G10L 19/00 |
| 2018/0113671 A1* | 4/2018 | Xie | G10L 13/08 |
| 2018/0150276 A1* | 5/2018 | Vacek | H04L 65/1089 |
| 2018/0275951 A1* | 9/2018 | Kagoshima | G06F 3/165 |
| 2018/0365232 A1* | 12/2018 | Lewis | G06F 40/58 |
| 2018/0367669 A1* | 12/2018 | Nicholson | G10L 15/222 |

FOREIGN PATENT DOCUMENTS

| | | |
|---|---|---|
| JP | 2002-169750 A | 6/2002 |
| JP | 2004-325848 A | 11/2004 |

\* cited by examiner

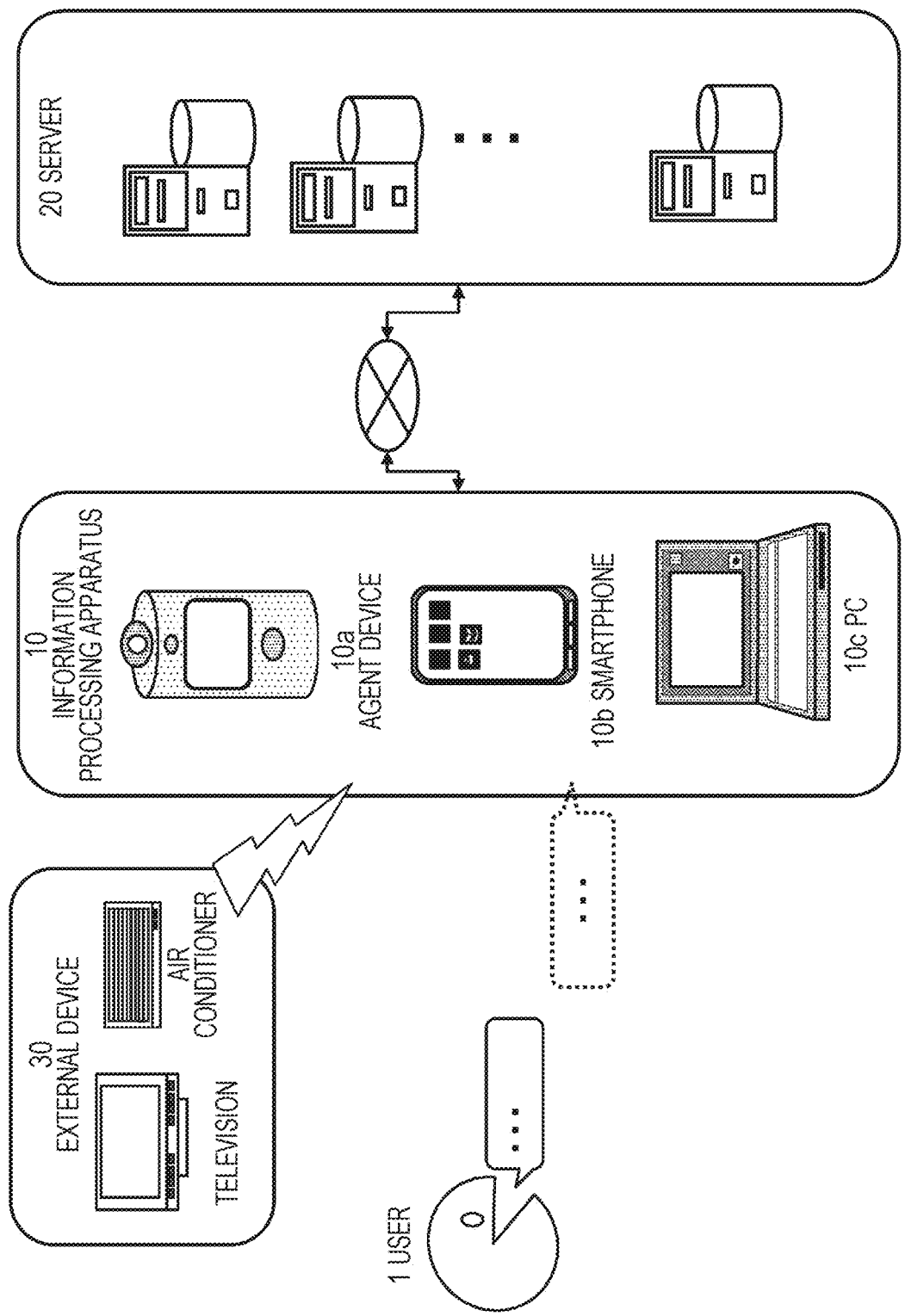

FIG. 3

| (A) SYSTEM UTTERANCE STOP CONDITION | (B) MERIT | (C) DEMERIT |
|---|---|---|
| (1) AT START OF USER UTTERANCE | (b1) STOP IMMEDIATELY SYSTEM UTTERANCE SPEECH, MAKING FOR USER TO TALK EASY | (c1) SYSTEM UTTERANCE IS SUSPENDED EVEN IN CASE WHERE USER UTTERANCE IS NOT DIRECTED TO SYSTEM OR USER UTTERS REQUEST FOR DISPLAYING INFORMATION TO SYSTEM FROM USER, SO UNNECESSARY SYSTEM UTTERANCE SUSPENSION OCCURS |
| (2) AT TIME OF USER UTTERANCE INTENTION UNDERSTANDABLE | (b2) SYSTEM UTTERANCE CAN CONTINUE IN CASE OF UNDERSTANDING THAT USER UTTERANCE INTENTION IS UNNECESSARY TO BE STOPPED | (c2) IF SYSTEM UTTERANCE STOPS SUDDENLY, USER FEELS UNCOMFORTABLE |
| | | (c3) SYSTEM UTTERANCE SPEECH DISTURBS USER UTTERANCE, MAKING TO TALK DIFFICULT |

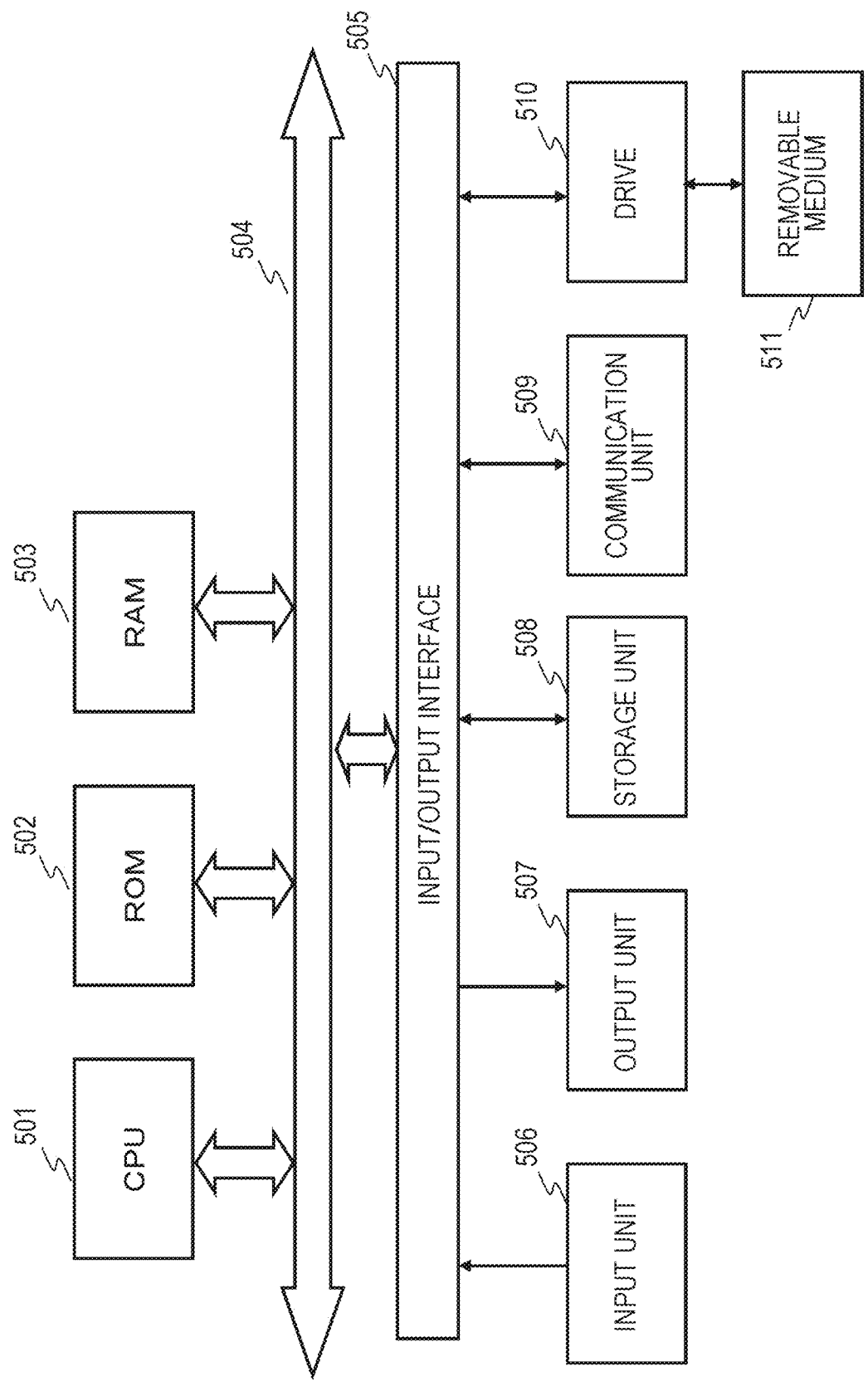

INFORMATION PROCESSING APPARATUS THAT FADES SYSTEM UTTERANCE IN RESPONSE TO INTERRUPTION

CROSS-REFERENCE TO RELATED APPLICATIONS

The present application is based on PCT filing PCT/JP2018/039825, filed Oct. 26, 2018, which claims priority to JP 2018-002162, filed Jan. 10, 2018, the entire contents of each are incorporated herein by reference.

TECHNICAL FIELD

The present disclosure relates to information processing apparatuses, information processing systems, and information processing methods, and programs. More specifically, the present disclosure relates to an information processing apparatus, an information processing system, and an information processing method, and a program that perform a speech recognition of user utterance, and perform processing and responses based on a speech recognition result of user utterance.

BACKGROUND ART

Recently, there has been increasing use of a speech recognition system that performs speech recognition of user utterance and performs various processing and responses based on a recognition result.

Such a speech recognition system recognizes and understands the user utterance input via a microphone and performs processing corresponding on the recognized and understood result.

For example, in a case where the user gives utterance of "tell me the tomorrow's weather", the processing is performed to acquire weather information from a weather information-providing server, generate a system response based on the acquired information, and output the generated response from a speaker. In one example, system utterance such as "Tomorrow's weather is fine, but there may be a thunderstorm in the evening", such a system utterance is output.

However, in such an interactive system, in some cases, the user starts speaking while the system is uttering.

The user utterance that interrupts system utterance during the system utterance is called "barge-in utterance".

In such a case, the system fails to determine whether to stop the system utterance immediately until interpreting the user utterance's intention.

If the system stops the system utterance immediately upon detecting the user utterance, problems such as mentioned below occur.

In one example, in a case where the user utterance is the utterance to a third party other than the system and the user is listening to the system utterance, there is a problem that the suspension of the system utterance gives the user an uncomfortable feeling and causes the user to wait until the system utterance resumes.

Furthermore, there may be a case where the user utterance is a request relating to the system utterance, such as a request to cause the system to display the contents of the system utterance, or the like. In such a case, the suspension of the system utterance is unnecessary. If the system utterance is suspended even in such a case, a problem occurs that the user will be made to wait until the subsequent system utterance is resumed.

On the other hand, if the system continues to utter until the system interprets the user utterance's intention, an overlap period between the system utterance and the user utterance occurs, which causes a problem that the system is difficult to recognize the user utterance and the user is difficult to speak.

Two examples can be considered for setting the timing of stopping the system utterance upon the occurrence of the interruption utterance, that is, the barge-in of the user utterance during performing the utterance, as follows:

(a) Stop the system utterance at a starting time of the user utterance (b) Stop the system utterance upon completion of the interpretation of the user utterance's intention on the side of the system However, the following problems occur in any of the processing of (a) and (b) mentioned above.

The sudden silence of the system utterance speech causes an uncomfortable feeling to the user's audibility.

In addition, the system is likely to generate noise if the sound level of the system utterance changes from loud to silence.

The problem as mentioned above occurs.

Moreover, as a technique in the related art that discloses processing for barge-in utterance, in one example, there are Patent Document 1 (Japanese Patent No. 6066471) and Patent Document 2 (Japanese Patent No. 5074759).

Patent Document 1 (Japanese Patent No. 6066471) discloses a configuration of acquiring information such as a length or timing of the user utterance and even a system condition, determining whether or not the user utterance is utterance directed to the system on the basis of the acquired information, and performing control for stopping the system utterance on the basis of the determined result.

Further, Patent Document 2 (Japanese Patent No. 5074759) discloses a configuration of determining whether there is a contradiction in the context between the system utterance and the user's barge-in utterance and presenting information regarding the contradiction to inform the user of contradictory contents.

The configurations disclosed in these related arts perform processing on the side of the system after the end of the user utterance. However, they disclose no configuration in which processing is performed on the side of the system at a starting time of the user utterance during executing the system utterance, that is, the barge-in utterance or during the utterance.

Thus, the overlap period between the system utterance and the user utterance occurs.

Consequently, the configurations disclosed in these related arts fail to solve the fundamental problem caused by the barge-in utterance, that is, the problem that the side of the system is difficult to recognize the user utterance and the user is difficult to speak.

CITATION LIST

Patent Document

Patent Document 1: Japanese Patent No. 6066471
Patent Document 2: Japanese Patent No. 5074759

SUMMARY OF THE INVENTION

Problems to be Solved by the Invention

As described above, there are problems that the occurrence of the user utterance performed during execution of system utterance, that is, the barge-in utterance makes it difficult for the side of the system to recognize the user utterance and for the user to speak.

The present disclosure is made in view of, in one example, the problems mentioned above, and is intended to provide an information processing apparatus, an information processing system, and an information processing method, and a program allowing achieving quick and optimal processing for the barge-in utterance.

Solutions to Problems

According to a first aspect of the present disclosure, there is provided an information processing apparatus including an output control unit configured to start fade processing of lowering at least one of volume, a speech rate, or a pitch (voice pitch) of system utterance from a starting time of barge-in utterance acting as user interruption utterance during executing the system utterance.

Further, according to a second aspect of the present disclosure, there is provided an information processing system including a user terminal, and a data processing server, in which the user terminal includes an output control unit configured to start fade processing of lowering at least one of volume, a speech rate, or a pitch (voice pitch) of system utterance from a starting time of barge-in utterance acting as user interruption utterance during executing the system utterance, the data processing server includes an utterance intention analysis unit configured to analyze intention of the barge-in utterance received from the user terminal, the output control unit of the user terminal determines whether or not the system utterance is necessary to be stopped on the basis of the barge-in utterance's intention and, in a case of determining that the system utterance is necessary to be stopped, stops the system utterance, and performs, in a case of determining that the system utterance is unnecessary to be stopped, depending on whether or not there is an important word in the system utterance after the fade processing, processing of determining which of (a) returning the system utterance to a state before the fade processing and continuing an output or (b) returning the system utterance to the state before the fade processing and executing rephrasing processing is to be executed.

Further, according to a third aspect of the present disclosure, there is provided an information processing method executed in an information processing apparatus including an output control unit configured to execute output control for starting fade processing of lowering at least one of volume, a speech rate, or a pitch (voice pitch) of system utterance from a starting time of barge-in utterance acting as user interruption utterance during executing the system utterance.

Further, according to a fourth aspect of the present disclosure, there is provided an information processing method executed in an information processing system including a user terminal, and a data processing server, in which the user terminal executes output control for starting fade processing of lowering at least one of volume, a speech rate, or a pitch (voice pitch) of system utterance from a starting time of barge-in utterance acting as user interruption utterance during executing the system utterance, the data processing server executes utterance intention analysis for analyzing intention of the barge-in utterance received from the user terminal, the user terminal includes an output control unit configured to determine whether or not the system utterance is necessary to be stopped on the basis of the barge-in utterance's intention and, in a case of determining that the system utterance is necessary to be stopped, stops the system utterance, and performs, in a case of determining that the system utterance is unnecessary to be stopped, depending on whether or not there is an important word in the system utterance after the fade processing, processing of determining which of (a) returning to a state before the fade processing and continuing an output or (b) returning to the state before the fade processing and executing rephrasing processing is to be executed.

Further, according to a fifth aspect of the present disclosure, there is provided a program causing an information processing apparatus to execute information processing of causing an output control unit to execute output control for starting fade processing of lowering at least one of volume, a speech rate, or a pitch (voice pitch) of system utterance from a starting time of barge-in utterance acting as user interruption utterance during executing the system utterance.

Note that the program of the present disclosure is, in one example, a program accessible as a storage medium or a communication medium provided in a non-transitory computer-readable form to an information processing apparatus or a computer system capable of executing various program codes. Such a program provided in the non-transitory computer-readable form makes it possible for the processing in accordance with the program to be implemented on the information processing apparatus or the computer system.

Still other objects, features, and advantages of the present disclosure will become apparent from a detailed description based on embodiments of the present disclosure as described later and accompanying drawings. Note that the term "system" herein refers to a logical component set of a plurality of apparatuses and is not limited to a system in which apparatuses of the respective components are provided in the same housing.

Effects of the Invention

The configuration of an embodiment according to the present disclosure allows achieving an apparatus and a method, capable of controlling an output of the system utterance upon the occurrence of the barge-in utterance to enable a smooth interactive between the user and the system.

Specifically, in one example, fade processing is performed to lower at least one of volume, a speech rate, or a pitch (voice pitch) of the system utterance from the starting time of the barge-in utterance that is the user interruption utterance during executing the stem utterance. Even after the completion of the fade processing, the output state upon completing the fade processing is maintained. In a case where the system utterance level is equal to or less than the predefined threshold during the fade processing, the system utterance is displayed on a display unit. Furthermore, one of stop, continuation, and rephrasing of the system utterance is executed on the basis of the intention of the barge-in utterance and whether or not an important word is included in in the system utterance.

The present configuration allows achieving the apparatus and method capable of controlling an output of the system utterance upon the occurrence of the barge-in utterance to enable a smooth interactive between the user and the system.

Note that the effects described in the present specification are merely examples and are not limited, and there may be additional effects.

BRIEF DESCRIPTION OF DRAWINGS

FIG. 2 is a diagram illustrated to describe a configuration example and a usage example of the information processing apparatus.

FIG. 3 is a diagram illustrated to describe a processing mode and merits or demerits of barge-in utterance.

FIG. 14 is a diagram illustrated to describe an example of a hardware configuration of the information processing apparatus.

MODE FOR CARRYING OUT THE INVENTION

Figure 1:
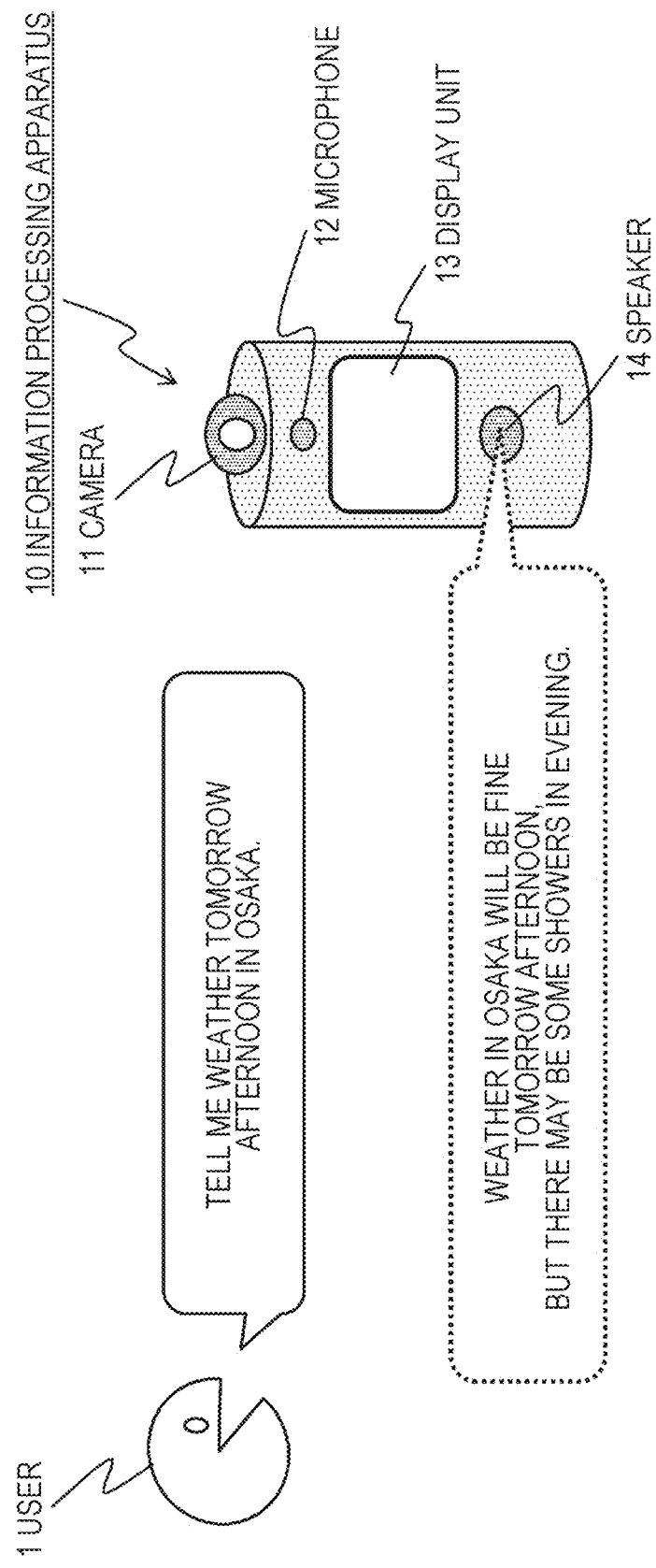
FIG. 1 is a diagram illustrated to describe a specific processing example of an information processing apparatus that recognizes user utterance and performs a response to the user utterance.

Details of each of an information processing apparatus, an information processing system, and an information processing method, and a program according to the present disclosure are now described with reference to the drawings. Moreover, a description is made according to the following items.

1. Configuration example of information processing apparatus

2. Overview of processing on user interruption utterance (barge-in utterance), executed by information processing apparatus of present disclosure 3. Configuration example of information processing apparatus 4. Processing sequence executed by information processing apparatus 5. Regarding specific processing example executed by output (speech or image) control unit 6. Other configuration examples 7. Effect of processing executed by information processing apparatus of present disclosure 8. Regarding configuration examples of information processing apparatus and information processing system 9. Regarding hardware configuration example of information processing apparatus 10. Summary of configuration of present disclosure 1. Regarding Configuration Example of Information Processing Apparatus First, with reference to FIG. 1, a configuration example of information processing apparatus of an embodiment according to the present disclosure will be explained.

FIG. 1 is a diagram illustrating an example of processing performed in an information processing apparatus 10 to recognize user utterance spoken by a user 1 and make a response.

The information processing apparatus 10 executes speech recognition processing on the user utterance of, for example, "Tell me the weather tomorrow afternoon in Osaka".

Moreover, the information processing apparatus 10 executes processing based on a result obtained by speech recognition of the user utterance.

In the example illustrated in FIG. 1, it acquires data used to a response to the user utterance of "tell me the weather tomorrow afternoon in Osaka", generates a response on the basis of the acquired data, and outputs the generated response through a speaker 14.

In the example illustrated in FIG. 1, the information processing apparatus 10 makes a system response as below.

The system response is "The weather in Osaka will be fine tomorrow afternoon, but there may be some showers in the evening".

The information processing apparatus 10 executes speech synthesis processing (text to speech: TTS) to generate the system response mentioned above and output it.

The information processing apparatus 10 generates and outputs the response using knowledge data acquired from a storage unit in the apparatus or knowledge data acquired via a network.

The information processing apparatus 10 illustrated in FIG. 1 includes a camera 11, a microphone 12, a display unit 13, and the speaker 14, and has a configuration capable of inputting or outputting speech and image.

The information processing apparatus 10 illustrated in FIG. 1 is referred to as, for example, a smart speaker, or an agent device.

As illustrated in FIG. 2, the information processing apparatus 10 according to the present disclosure is not limited to an agent device 10a and can be implemented as various apparatus forms such as a smartphone 10b and a PC 10c.

The information processing apparatus 10 recognizes the utterance of the user 1 and not only performs the response based on the user utterance but also, for example, executes control of an external device 30 such as a television and an air conditioner illustrated in FIG. 2 in accordance with the user utterance.

For example, there is a case where the user utterance is a request such as "Change the television channel to channel 1"

and "Set the temperature of the air conditioner to 20 degrees". In this case, the information processing apparatus 10 outputs a control signal (Wi-Fi, infrared light, etc.) to the external device 30 on the basis of a speech recognition result of the user utterance to cause the external device 30 to execute control in accordance with the user utterance.

Moreover, the information processing apparatus 10, when connecting to a server 20 via a network, is capable of acquiring information necessary to generate a response to the user utterance from the server 20. In addition, it is also possible to cause the server to execute the speech recognition processing or the semantic analysis processing.

2. Overview of Processing on User Interruption Utterance (Barge-in Utterance), Executed by Information Processing Apparatus of Present Disclosure Next, an overview of processing on user interruption utterance (barge-in utterance), executed by information processing apparatus of the present disclosure will be explained.

In a speech interactive system, in a case where a user performs interruption utterance (barge-in utterance) while the information processing apparatus is executing the system utterance using speech synthesis processing (text-to-speech: TTS), there is a problem that the side of the system is difficult to recognize the user utterance and the side of the user is difficult to speak.

Two setting examples can be considered as the setting of the stop timing of the system utterance upon the occurrence of such barge-in utterance, as follows:

(1) Stop the system utterance at the starting time of user utterance (2) Stop the system utterance upon completing of interpretation of the user utterance's intention on the side of the system FIG. 3 illustrates the merits and demerits of performing the processing of (1) and (2) mentioned above.

As shown in FIG. 3, the merit and demerit of stopping the system utterance (1) at the start of the user utterance are as follows:

Merit:

Merit is that the system utterance speech is stopped immediately, making it easy for the user to speak.

Demerit:

Demerit is that the system utterance is suspended even in the case where the user utterance is not directed to the system or the user utters a request for displaying information to the system from the user, so unnecessary system utterance suspension occurs.

If the system utterance is stopped suddenly, the user will feel uncomfortable.

On the other hand, the merit and demerit of stopping the system utterance (2) upon completion of the interpretation of the user utterance's intention on the system side are as follows:

Merit:

Merit is that, if the user utterance's intention is regarded as intention unnecessary to be stopped, the utterance of the system can continue.

Demerit:

If the system utterance is stopped suddenly, the user will feel uncomfortable.

The system utterance speech disturbs the user utterance, making it difficult to speak.

As described above, there are demerits in any of two stop modes of the system utterance as follows:

(1) Stop the system utterance upon the starting time of the user utterance (2) Stop the system utterance upon completion of the interpretation of the user utterance's intention on the side of the system The configuration of the present disclosure described below has a configuration that reduces the demerits mentioned above.

An overview of processing on the user interruption utterance (barge-in utterance) executed by the information processing apparatus according to the present disclosure is now described with reference to FIG. 4.

Figure 4:
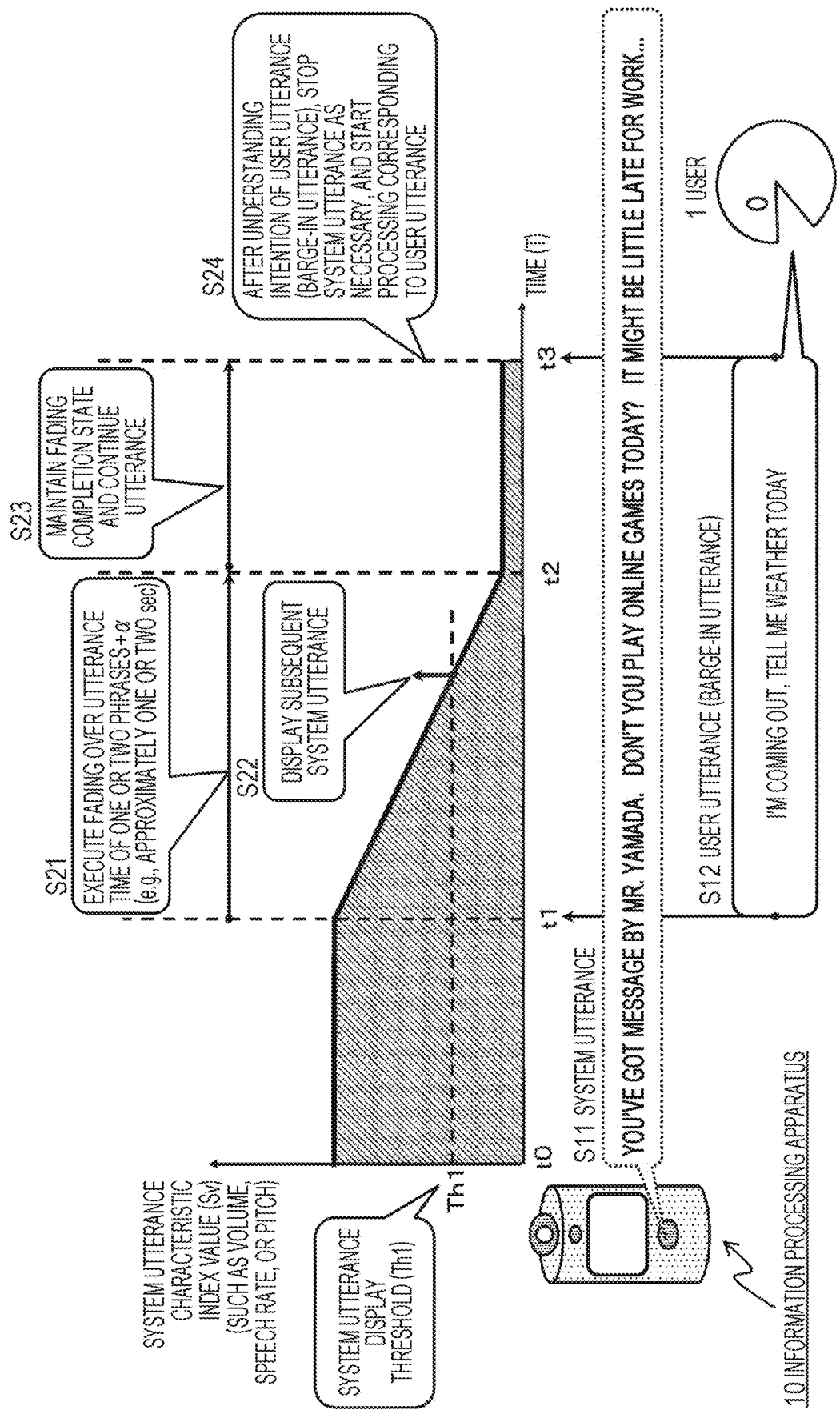
FIG. 4 is a diagram illustrated to describe an overview of processing executed by the information processing apparatus according to the present disclosure.

In step S11 shown in FIG. 4, the information processing apparatus 10 starts the system utterance.

The graph shown in FIG. 4 is a graph in which time (T) is set on the horizontal axis and a system utterance characteristic index value (Sv) is set on the vertical axis.

The system utterance characteristic index value (Sv) is an index value based on a value of at least one of volume, a speech rate, or a pitch of the system utterance, and has the characteristics, as follows:

The higher the volume of system utterance, the larger the index value

The faster the system utterance speech rate, the larger the index value

The higher the pitch (voice pitch) of the system utterance, the larger the index value The index value includes above characteristics.

In one example, in the graph shown in FIG. 4, the system utterance during the period from time t0 to t1 is the system utterance having at least any of the characteristics as follows:

Volume of system utterance is high

Speech rate of system utterance is fast

Pitch (voice pitch) of system utterance is high

On the other hand, the system utterance at and after time t2 is the system utterance having at least any of the characteristics as follows:

Volume of system utterance is low

Speech rate of system utterance is slow

Pitch (voice pitch) of system utterance is low

The information processing apparatus 10 starts the system utterance from time t0 in step S11 using speech synthesis processing (TTS) as follows:

System utterance=You've got a message by Mr. Yamada. Don't you play online games today? It might be a little late for work . . . .

This system utterance is started.

During executing the system utterance, in step S12, the user 1 starts the user utterance (barge-in utterance) from time t1, as follows:

User utterance (barge-in utterance)=I'm coming out, tell me the weather today

The information processing apparatus 10 of the present disclosure starts controlling the output of the system utterance from time t1 at which the user utterance (barge-in utterance) starts. Specifically, at least one of the processing is executed as follows:

Decrease gradually the volume of system utterance

Slow down gradually the rate of system utterance

Lower gradually the pitch (voice pitch) of system utterance

At least one of the above processing is executed. Moreover, three processing operations mentioned above or any two processing operations can be combined and executed.

Moreover, in the following, such a processing operation is referred to as fade processing.

The processing mentioned above is the processing of step S21 shown in FIG. 4.

The information processing apparatus 10 executes the fade processing for the utterance time of one or two phrases+α of typical user utterance (e.g., approximately a little over one second to approximately two seconds).

In the example shown in the figure, the fade processing is executed from time t1 to t2.

The information processing apparatus 10 performs control for lowering gradually the volume of the system utterance, in one example, in the fade processing period (t1 to t2).

If the system utterance characteristic index value (Sv) is equal to or less than a predefined threshold (system utterance display threshold (Th1)) during the fade processing period, the information processing apparatus 10 executes the processing for displaying the subsequent system utterance on the display unit of the information processing apparatus 10.

This processing is the processing of step S22 shown in FIG. 4.

This processing is the processing for notifying, as display data, the user of contents of the system utterance that has been a level difficult for the user to hear.

The information processing apparatus 10 ends the fade processing at time t2. The information processing apparatus 10 continues to execute the system utterance even after the end of the fade processing.

However, the system utterance after the end of the fade processing is executed in a state in which the characteristics at the time of completion of the fade processing are maintained (ducking state).

In other words, the characteristics are as follows:
Volume of system utterance is low
Speech rate of system utterance is slow
Pitch (voice pitch) of system utterance is low The system utterance is executed while maintaining at least any one of the characteristics mentioned above, that is, the characteristics at the time of completion of the fade processing (ducking state).

This processing is the processing of step S23 shown in FIG. 4.

Subsequently, at time t3, upon completion of the intention interpretation processing of the user utterance (barge-in utterance) executed in step S12, that is, "User utterance (barge-in utterance)=I'm coming out, tell me the weather today", the information processing apparatus 10 executes the processing of step S24 illustrated in FIG. 4.

In other words, after understanding the intention of the user utterance (barge-in utterance), the system utterance is stopped as necessary, and response processing to the user utterance is executed.

In one example,

"User utterance (barge-in utterance)=I'm coming out, tell me the weather today".

A system response to this user utterance, for example,

"System response=Today's weather is fine. However, there may be a thunderstorm in the evening"

The processing of generating and outputting such a system response is executed.

As described above, the information processing apparatus 10 of the present disclosure executes the fade processing in the case of detecting the user utterance (barge-in utterance) during executing the system utterance. In other words, as follows:

Decrease gradually the volume of system utterance
Slow down gradually the rate of system utterance
Lower gradually the pitch (voice pitch) of system utterance At least one of the above processing is executed.

Moreover, the time period of the fade processing (time t1 to t2 shown in FIG. 4) is set to a typical user utterance, that is, a time for performing utterance of one or two phrases+α (e.g., approximately a little over one second to approximately two seconds).

In the case of a short request or utterance that is not directed to the system, which terminates with approximately one or two phrases from the user, it is possible to interpret the user utterance's intention before completion of the fading of the system utterance.

It is possible for the user to set the duration of the fade processing (time t1 to t2 shown in FIG. 4).

Such a user-adjustable configuration makes it possible, in one example, for a user who often talks slowly to perform the processing of setting the duration of the fade processing to be longer (two to four seconds).

After starting the fading, in one example, in the case where the volume, speech rate, or pitch (voice pitch) of the system utterance is at a level that is difficult for the user to listen, the contents of the subsequent system utterance are displayed on the screen of the display unit 13 of the information processing apparatus 10.

Furthermore, even after the volume, pitch (voice pitch), or utterance rate of the system utterance reaches a level that is difficult for the user to listen after the completion of the fade processing, if the user utterance's intention fails to be interpreted, the system utterance continues after the completion of the fading.

Thus, if the user utterance is long utterance (more than one or two phrases), the system utterance continues even after the completion of the fading.

In a case where the information processing apparatus 10 is capable of acquiring the user utterance's intention, the information processing apparatus 10 performs the processing of stopping the system utterance depending on the acquired user's intention and executes processing corresponding to the user utterance.

However, in a case where, in one example, the user utterance is the utterance directed to a third party other than the system and the user is estimated to be listening to the system utterance, the system utterance continues.

In addition, even in the case where the user utterance is a request regarding system utterance, such as a request to cause the system to display the system utterance contents, or the like, the suspension of the system utterance is determined to be unnecessary, and the system utterance is continued.

The system utterance after interpreting the intention of the user utterance is executed by returning it to the original normal output characteristics.

The information processing apparatus 10 of the present disclosure performs the processing mentioned above. The fade processing performed from the start time of the barge-in utterance makes it easier for the system to recognize the user utterance and enables the user to continue to execute the user utterance with no problems, without making it difficult for the user to speak.

3. Configuration Example of Information Processing Apparatus

Next, with reference to FIG. 5, a specific configuration example of the information processing apparatus will be described.

Figure 5:
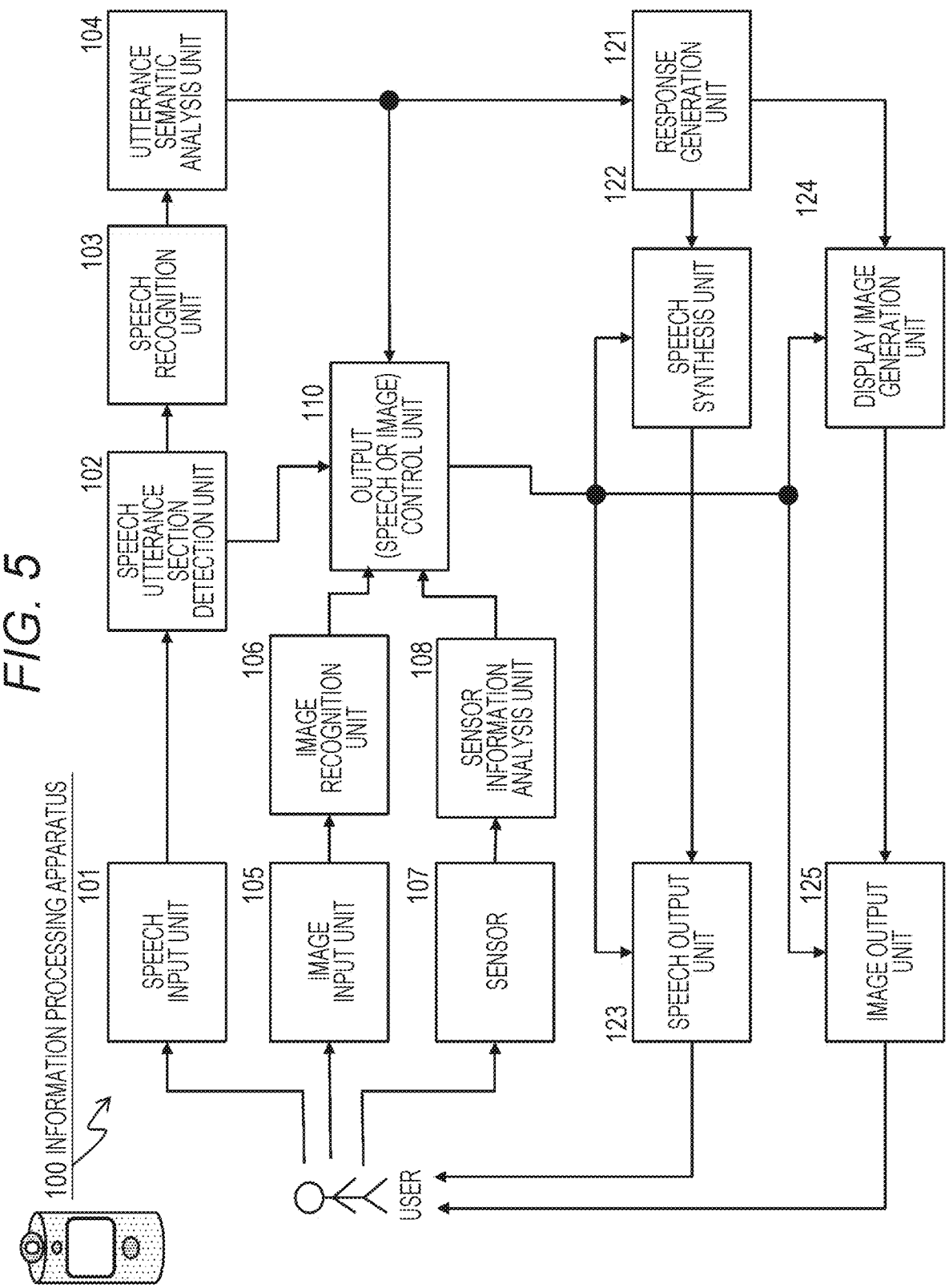
FIG. 5 is a diagram illustrated to describe a specific configuration example of the information processing apparatus.

FIG. 5 is a diagram illustrating an example of a configuration of the information processing apparatus 100 that recognizes user utterance and responds to it.

As illustrated in FIG. 5, the information processing apparatus 100 includes a speech input unit 101, a speech utterance section detection unit 102, a speech recognition unit 103, an utterance semantic analysis unit 104, an image input unit 105, an image recognition unit 106, a sensor 107, and a sensor information analysis unit 108, an output (speech or image) control unit 110, a response generation unit 121, a speech synthesis unit 122, a speech output unit 123, a display image generation unit 124, and an image output unit 125.

Note that all of these components can be also configured in the single information processing apparatus 100, but may be configured such that some components or functions are provided in another information processing apparatus or an external server.

The user utterance speech is input to the speech input unit 101 such as a microphone.

The speech input unit (microphone) 101 inputs the received user utterance speech to the speech utterance section detection unit 102.

The speech utterance section detection unit 102 executes speech utterance section detection processing on the user utterance speech that is input. The speech utterance section detection unit 102 has, in one example, a voice activity detection (VAD) function, executes detection processing of determining whether or not the user performs the speech utterance with a high response, and specifies the start and end timings of the user utterance with low latency.

The voice activity detection (VAD) is technology that makes it possible to differentiate the user utterance speech and environmental noise from an input sound signal and to specify a period during which the user speech is uttered.

The speech utterance section information detected by the Speech utterance section detection unit 102 is input to the speech recognition unit 103 together with the speech data. Furthermore, the speech utterance section information is also input to an output (speech or image) output control unit 110.

The speech recognition unit 103 has, for example, an automatic speech recognition (ASR) function, and converts speech data into text data constituted by a plurality of words.

The text data generated by the speech recognition unit 103 is input to the utterance semantic analysis unit 104.

The utterance semantic analysis unit 104 selects and outputs intent candidate of a user included in the text.

The utterance semantic analysis unit 104 has, for example, a natural language understanding function such as natural language understanding (NLU), and estimates an intention (intent) of the user utterance and entity information (entity) which is a meaningful element (significant element) included in the utterance from the text data.

Specific examples are described. In one example, assume that the user utterance mentioned below is input.

The intention (intent) of the user utterance of "Tell me the weather tomorrow afternoon in Osaka"

is to know the weather, and the entity information (entity) is Osaka, tomorrow, afternoon, and words of these.

If an intention (entity) and entity information (entity) can be accurately estimated and acquired from a user utterance, the information processing apparatus 100 can perform accurate processing on the user utterance.

For example, it is possible to acquire the weather for tomorrow afternoon in Osaka and output the acquired weather as a response in the above example.

Moreover, the intention estimation processing of the user utterance in the utterance semantic analysis unit 104 is performed after the end of the speech utterance section of the user utterance, that is, after completion of the user utterance. Thus, in the period during which the user is uttering, that is, during the period when the detection of the user utterance is being executed, the user utterance's intention fails to be acquired.

In a case where the speech utterance section of the user utterance is ended and the intention of the user utterance is estimated by the utterance semantic analysis unit 104, that is, the estimation of the intention (intent) and the entity information (entity) for the user utterance is completed, the estimation result is input to the response generation unit 121.

The response generation unit 121 generates a response to the user on the basis of the intention (intent) of the user utterance estimated by the utterance semantic analysis unit 104 and the entity information (entity). The response includes at least one of speech or image.

In a case where a response speech is output, the speech synthesis unit 122 outputs speech information generated by speech synthesis processing (text-to-speech: TTS) through the speech output unit 123 such as a speaker.

In a case of outputting the response image, the display image information generated by the display image synthesis unit 124 is output through the image output unit 125 such as a display.

The image output unit 125 includes, in one example, a display such as an LCD and an organic EL display, a projector that performs projection display, or the like.

Moreover, the information processing apparatus 100 is capable of outputting and displaying an image on an external connection device, for example, a television, a smartphone, a PC, a tablet, an argumented reality (AR) device, a virtual reality (VR) device, and other home appliances.

The output (speech or image) control unit 110 is input with data as follows:

(1) User speech utterance section information detected by the speech utterance section detection unit 102 on the basis of the user utterance (2) Intention (intent) and entity information (entity) of the user utterance generated by executing natural-language understanding (NLU) on text data in the utterance semantic analysis unit 104

Further, the output (speech or image) control unit 110 is input with information as follows:

(3) Result information of image recognition by the image recognition unit 106 on images of the uttering user and the surroundings acquired by the image input unit 105 such as a camera (4) Sensor analysis information analyzed by the sensor information analysis unit 108 on the basis of the detected information of the uttering and the surrounding state acquired by the sensor 107

The output (speech or image) control unit 110 is input with the information of (1) to (4) mentioned above to control the system utterance. In other words, the control of output information is performed, as follows:

Speech information that is generated by the speech synthesis unit 122 and is output through the speech output unit 123 such as a speaker Image information that is generated by the display image synthesis unit 124 and is output through the image output unit 125 such as a display Specifically, in one example, the processing described above with reference to FIG. 4 is performed.

In other words, upon detecting the user interruption utterance, that is, the barge-in utterance during the system utterance, the fade processing of the system utterance is executed. Specifically, as follows:

Decrease gradually the volume of system utterance

Slow down gradually the rate of system utterance

Lower gradually the pitch (voice pitch) of system utterance

At least one of the above processing is executed.

Furthermore, the image display control of the system utterance is executed.

In a case of performing the control on the barge-in utterance, first, the output (speech or image) control unit 110 is input with the speech utterance section information of the user utterance from the speech utterance section detection unit 102.

In the first place, user utterance start timing information is input.

Then, after completing the user utterance period, the user utterance intention estimated by the utterance semantic analysis unit 104 is input.

In addition, the sensor analysis information that is analyzed by the sensor information analysis unit 108 is input on the basis of image recognition result information and state detection information. The image recognition result information is obtained by the image recognition unit 106 configured to recognize an image of the uttering user and the surroundings acquired by the image input unit 105 such as a camera. The state detection information indicates a state of the uttering user and the surroundings acquired by the sensor 107.

The output (speech or image) control unit 110 performs, in one example, the processing described above with reference to FIG. 4 on the basis of the information mentioned above that is input during the user utterance period.

A specific processing example will be described later.

4. Regarding Processing Sequence Executed by Information Processing Apparatus A sequence of processing executed by the information processing apparatus 100 is now described with reference to the flowcharts illustrated in FIGS. 6 and 7.

Figure 6:
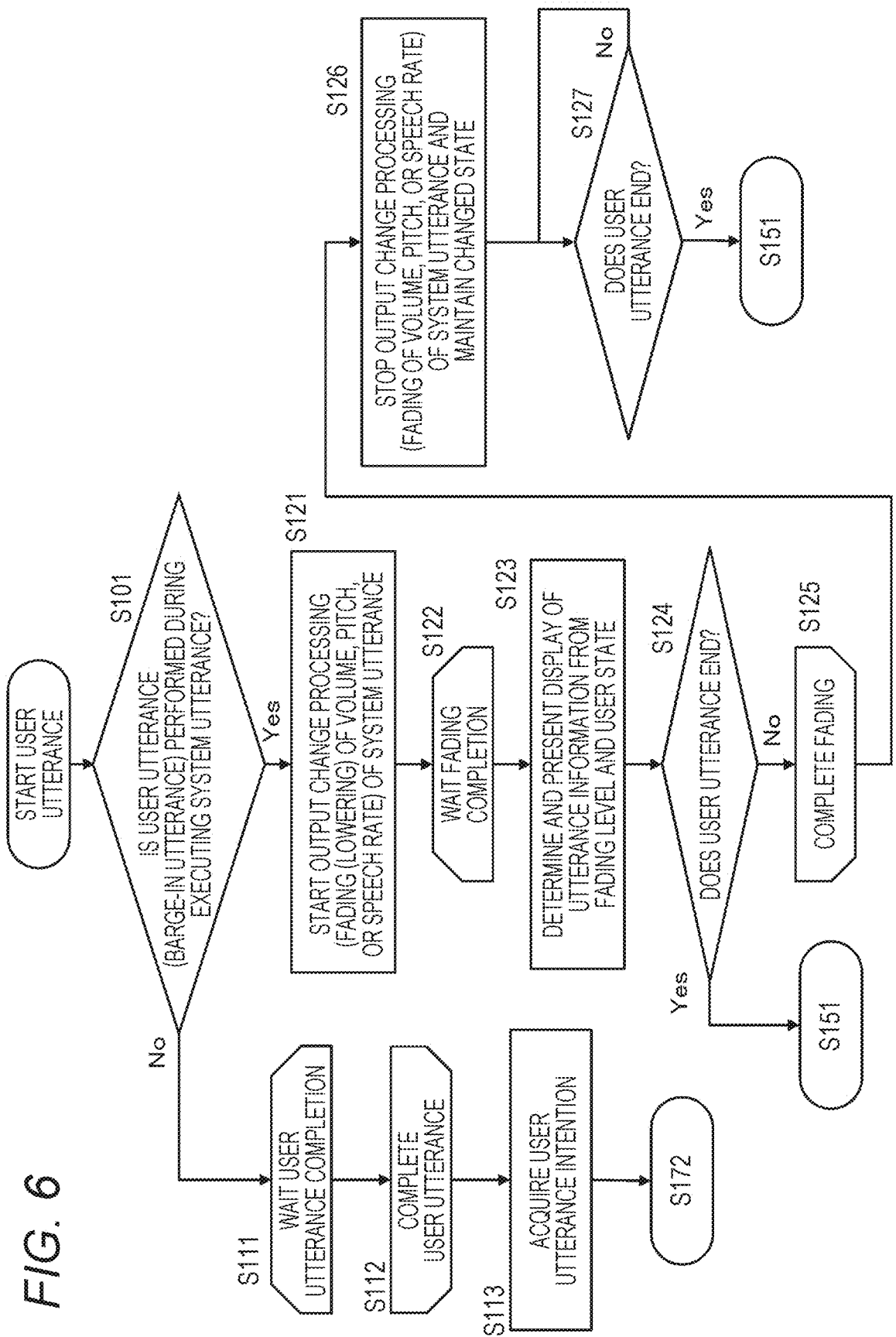
FIG. 6 is a flowchart illustrated to describe processing executed by the information processing apparatus.
Figure 7:
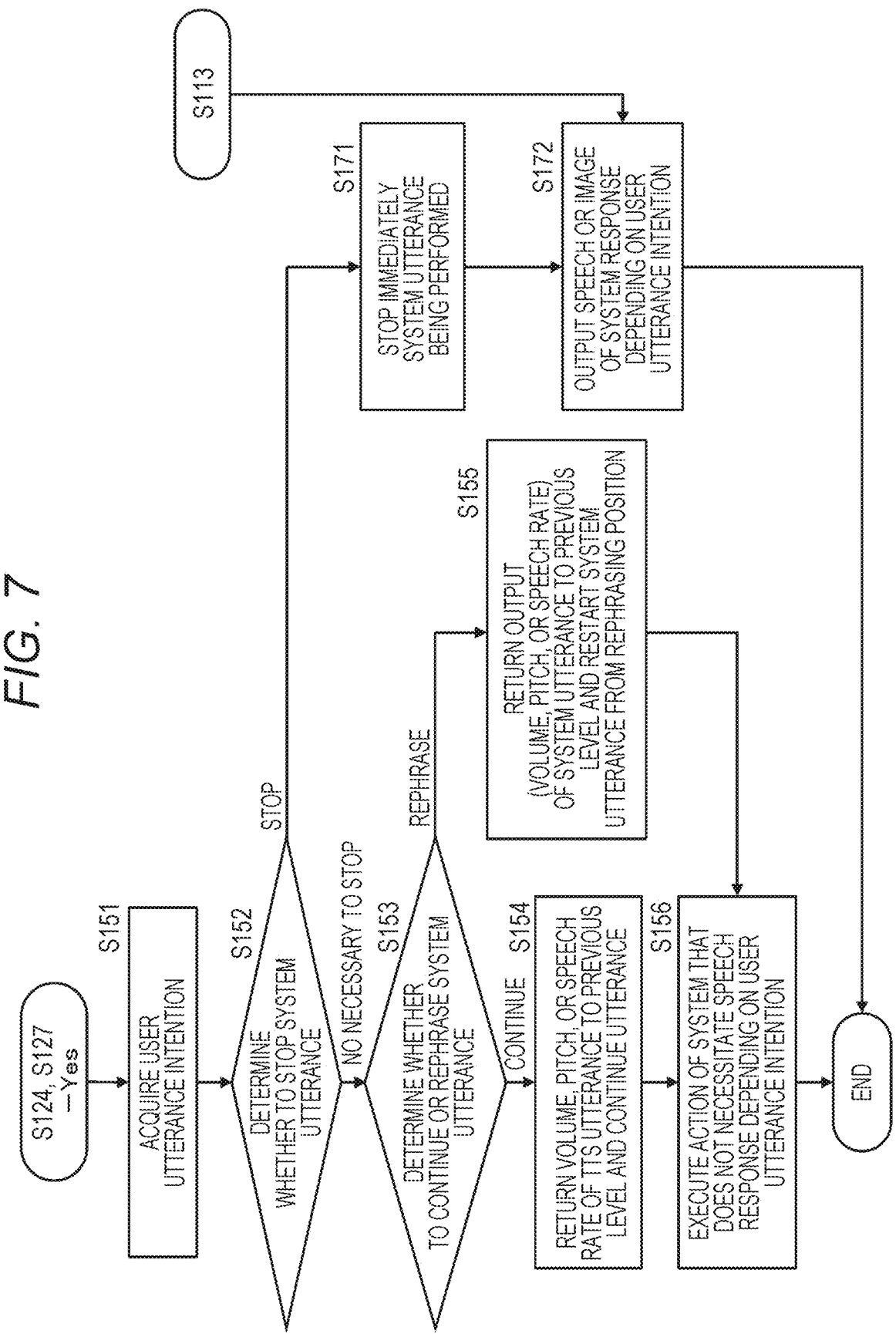
FIG. 7 is a flowchart illustrated to describe processing executed by the information processing apparatus.

The processing according to the flowcharts shown in FIGS. 6 and 7 is capable of being executed in accordance with, in one example, a program stored in the storage unit of the information processing apparatus 100.

The processing in the information processing apparatus 100 can be performed, for example, as program execution processing by a processor such as a CPU having a program execution function.

The processing of each step of the procedure illustrated in FIGS. 6 and 7 is now described.

Moreover, the procedures shown in FIGS. 6 and 7 are started with, as a trigger, a fact that the information processing apparatus 100 detects the input of the user utterance.

(Step S101)

First, in step S101, it is determined whether or not the user utterance detected by the information processing apparatus 100 is the user utterance performed during executing the system utterance, that is, the barge-in utterance.

If the user utterance is the barge-in utterance, the processing proceeds to step S121.

On the other hand, if the user utterance is not the barge-in utterance, that is, if the user utterance is the utterance during a period in which the system utterance is not being executed, the processing proceeds to step S111.

(Steps S111 to S113)

The processing performed in the case where the user utterance is not the barge-in utterance in step S101, that is, the user utterance is the utterance during a period when the system utterance is not being executed is now described.

If the user utterance is not the barge-in utterance, in steps S111 to S112, completion of the user utterance is awaited, and then in step S113, the utterance semantic analysis unit 104 analyzes the text corresponding to the user utterance generated by the speech recognition unit 103. Then, the user utterance's intention is acquired.

As described above, the utterance semantic analysis unit 104 has, for example, a natural language understanding function such as natural language understanding (NLU), and estimates the user utterance's intention (intent) or entity information (entity) that is a semantic element (significant element) included in the utterance from the text data.

Then, the processing proceeds to step S172, where a system response is made depending on the user utterance's intention.

The system response is executed as at least one of speech output or image output. In a case where speech is output, the speech synthesis unit 122 outputs speech information generated by speech synthesis processing (text-to-speech: TTS) through the speech output unit 123 such as a speaker.

In a case where an image is output as a response, the display image information generated by the display image synthesis unit 124 is output through the image output unit 125 such as a display.

(Step S121)

The processing performed in the case where it is determined in step S101 that the user utterance is the barge-in utterance, that is, it is determined that the user utterance is the utterance performed during executing the system utterance is now described.

If it is determined that the user utterance is the barge-in utterance, the output (speech or image) control unit 110 starts the fade processing on the system utterance. Specifically, as follows:

(a) Decrease gradually the volume of system utterance (b) Slow down gradually the rate of system utterance (c) Lower gradually the pitch (voice pitch) of system utterance At least any of the above processing of (a) to (c) is started.

The fading in the direction of lowering the volume and the pitch (voice pitch) makes the user gradually less likely to hear the system utterance. This makes it easier for the user to speak as the user continues to speak (as the utterance is longer).

A person, when talking, decides what to say before uttering approximately one or two phrases, which are the first semantic sequences, but when giving longer utterance, while talking it is considered that the utterance continues while considering what to say approximately one or two phrases that are the next semantic sequences. On the basis of this idea, the fade processing is performed during first approximately one or two phrases of the user utterance time to make the system utterance less likely to be heard by the user, thereby making it easier for the user to give longer utterance.

Further, the change in the rates of the system utterance in a direction of lowering (slowing) makes it possible for the progress of the system utterance after the fading execution period and the completion of the fade processing to be delayed. As a result, the probability that an important word is included in the system utterance during a period in which the user is difficult to hear or fails to hear is reduced.

Consequently, in the continuation of the system utterance or the rephrasing determination processing executed in the subsequent step S153, the continuation of the system utterance is easy to select.

Moreover, the details of the system utterance continuation processing and the rephrasing processing will be described later.

The rephrasing of the system utterance causes the user to feel redundant and takes time to present information, so it is desirable to avoid the system utterance as much as possible and to continue the system utterance as it is. The delaying the progress of the system utterance by lowering the rate of the system utterance obtains an effect that the rephrasing is less likely to occur.

(Steps S122 to S125)

In steps S122 to S125, the fade processing continues for a certain period.

As described above with reference to FIG. 4, the fade processing continues to be executed over the utterance time of one or two phrases+α of typical user utterance (e.g., approximately a little over one second to approximately two seconds).

After completion of the fading, the fading is performed to be such a level in which the volume and pitch of the system utterance speech do not disturb the user utterance, that is, a level that is failed to be recognized as a word even if heard.

By setting the fading time to the time for uttering one or two phrases+α, if the user utterance is short, the level of the system utterance can be maintained without dropping. Moreover, this processing has an effect of increasing the possibility in which a determination that system utterance rephrasing is unnecessary is made in the determination processing in step S153 described later.

In the case where the user utterance is long, after the start of the user utterance, the system utterance is difficult for the user to hear following one or two phrases, so there is an effect that the user easily continues the user utterance.

Moreover, the fade processing can be set so that the characteristics (volume, speech rate, and pitch) of the system utterance decrease linearly as described above with reference to FIG. 4, or the decrease can be performed using a log curve on the basis of human auditory characteristics.

Moreover, if the user utterance is not completed during executing the fade processing and a predetermined fade processing time (e.g., approximately a little over one second to approximately two seconds) elapses, the system utterance is set to be a state where the fading completion state is maintained (ducking state).

In the state where the fading completion state is maintained (ducking state), it can be understood that the volume and pitch (voice pitch) of the system utterance speech is, for example, a level that does not disturb the user utterance, that is, the system utterance speech exists. However, this level is a level that fails to recognize it as words if heard, and the rate is the lowest limit that is not unnatural in hearing.

The system utterance continues at least until the completion of the user utterance is detected while the state of the volume, pitch (voice pitch) and rate is maintained.

The maintaining of the fading completion state (ducking state) makes it possible for the user to know how much subsequent utterance has occurred in the system utterance at a level in which the user utterance is not disturbed.

In step S123, if the characteristic index value (Sv) of the system utterance (=the calculated index value based on the volume, speech rate, and pitch (voice pitch)) within the execution period of the fade processing is equal to or less than a predefined threshold (system utterance display threshold (Th1)), the processing of displaying the subsequent system utterance on the display unit of the information processing apparatus is executed.

Figure 8:
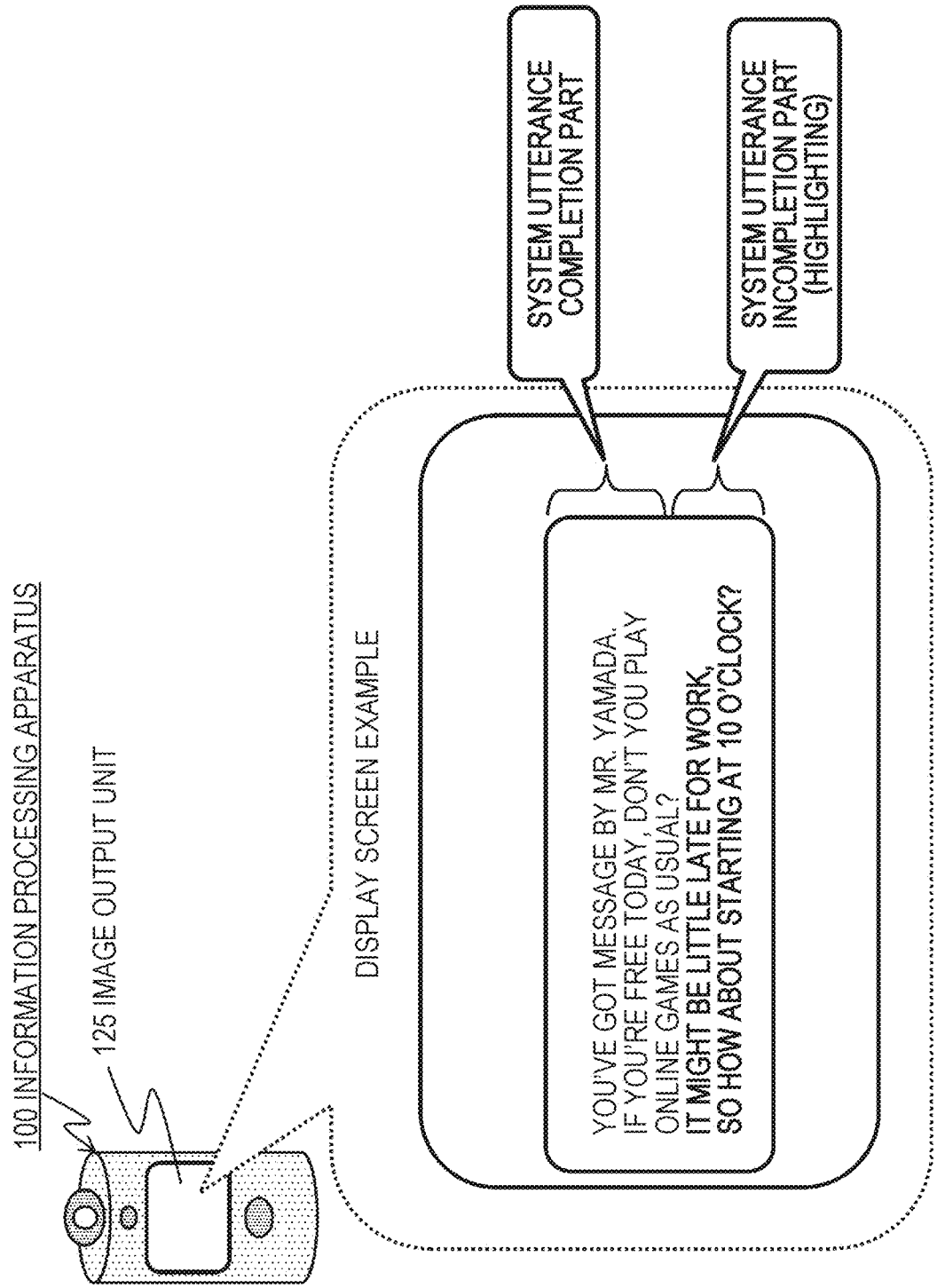
FIG. 8 is a diagram illustrated to describe a specific example of processing executed upon detecting user utterance (barge-in utterance) during executing system utterance.

In one example, as shown in FIG. 8, if the fading level is equal to or less than a predefined threshold (system utterance display threshold (Th1)) during the fading (during the state of waiting for the completion of the fading), the processing of displaying as text the system utterance contents on the image output unit 125 (display unit) of the information processing apparatus 100 is performed.

Moreover, the threshold (the system utterance display threshold (Th1)) is a variable parameter and can be set within a range lower than the fading start level and equal to or higher than the fading completion state (ducking state) level. The threshold is desirably set to a level at which it is difficult to recognize the speech of the system utterance as words.

The display position of the system utterance on the image output unit 125 (display unit) is decided by applying the sensor analysis information analyzed by the sensor information analysis unit 108. This decision is based on the image recognition result information, which is generated by the image recognition unit 106 on the basis of the input information of the image input unit 105 such as a camera and is input in the output (speech or image) control unit 110, and the information from the sensor 107.

In one example, in a case where the user is looking at the image output unit 125 (display unit) or a projection screen of the information processing apparatus 100, or facing the information processing apparatus 100, the text of the system utterance is displayed on a display device of the main body of the information processing apparatus 100.

In a case where the user is looking at the screen of a linked device, such as a monitor screen of a television, smartphone, PC, tablet, or other home appliances, the text is displayed on the screen of the linked device being viewed by the user.

In addition, in a case where the user is wearing an argumented reality (AR) device or a virtual reality (VR) device, the text of the system utterance is displayed within the user's field of view of the device as mentioned above.

Moreover, the entire contents of the system utterance can be displayed as text, or only the text that is not yet uttered by the system can be displayed.

In addition, as the example illustrated in FIG. 8, the last part where the system utterance is completed and the beginning part where the system utterance is not completed can be distinguished and displayed.

In addition, the control to switch between a display of the entirety and a display of only the unuttered part of the system depending on the number of display location areas can be performed.

In this way, the system presents a text that has not yet been uttered to the user as visual information, so even in the case where there is important information in the latter half of the system utterance and, before that, the user starts to give interruption utterance (barge-in utterance), it is possible to present important information to the user.

In the case of the example shown in FIG. 8, the user starts the interruption utterance (barge-in utterance) before hearing the information of starting at 10 o'clock from the system utterance, the user is able to know that it starts at 10 o'clock by looking at the displayed text on the display unit.

If the user utterance (barge-in utterance) is completed within the period in which the fade processing is executed (determination in step S124 is Yes), the processing proceeds to step S151.

In addition, if the predefined fade processing execution period (e.g., approximately a little over one second to approximately two seconds) elapses before completing the user utterance (barge-in utterance), the processing proceeds to step S126.

(Step S126)

In step S126, the output (speech or image) control unit 110 ends the fade processing of the system utterance. However, the system utterance continues while maintaining the characteristics at the end of the fade processing.

In other words, the characteristics are as follows:

Volume of system utterance is low

Speech rate of system utterance is slow

Pitch (voice pitch) of system utterance is low

The system utterance is continuously executed while maintaining at least one of the characteristics mentioned above, that is, the characteristics at the time of completion of the fade processing.

(Step S127)

In step S127, it is determined whether the user utterance (barge-in utterance) is completed.

This determination is based on the speech utterance section information detected by the speech utterance section detection unit 102.

If it is determined that the user utterance (barge-in utterance) is completed, the processing proceeds to step S151.

(Step S151)

In step S151, the utterance semantic analysis unit 104 analyzes the text corresponding to the user utterance generated by the speech recognition unit 103. Then, the user utterance's intention is acquired.

As described above, the utterance semantic analysis unit 104 has, for example, a natural language understanding function such as natural language understanding (NLU), and estimates the user utterance's intention (intent) or entity information (entity) that is a semantic element (significant element) included in the utterance from the text data.

(Step S152)

In step S152, the output (speech or image) control unit 110 determines whether to stop the system utterance.

The output (speech or image) control unit 110 determines, in one example, whether to stop the system utterance on the basis of the intention (intent) of the user utterance input from the utterance semantic analysis unit 104.

Specifically, the following processing is executed.

If the response to the user is accompanied by the speech output in executing an action of the system function depending on the user utterance intention, it is determined that the system utterance currently being output is necessary to be stopped.

If the response to the user is not accompanied by the speech output, it is determined that it is not necessary to stop the system utterance currently being output.

An example of specific system utterance stop determination processing is described, as follows:

(Example 1 of Determining that System Utterance is Unnecessary to be Stopped)

(1a) Case where the user utterance is being executed by a third party other than the system (the information processing apparatus 100)

(1b) Case where the user's intention is incapable of being interpreted (1c) Case where the system (the information processing apparatus 100) does not have an action function depending on the user utterance intention (incapable of executing)

In such cases, it is determined that the system utterance is unnecessary to be stopped because the speech response from the system (the information processing apparatus 100) is incapable being made to the user utterance (barge-in utterance).

(Example 2 of Determining that System Utterance is Unnecessary to be Stopped)

If there is the user utterance, for example,

"Show me the attached photo", "Turn on the light", "Turn on the air conditioner or TV", "Take a photo", "Play next song", or "Turn volume up or down", Case where the user utterance intention can be understood and the system (the information processing apparatus 100) is capable of executing an action depending on the user utterance intention without outputting a response speech In such a case, the system (the information processing apparatus 100) only necessitates the execution of an action based on the user utterance intention and does not necessitate a speech response, so it is determined that the system utterance is unnecessary to be stopped.

(Example 1 of Determining that System Utterance is Necessary to be Stopped)

If there is the user utterance, for example,

"Tell me the weather", "Reply to this email with xxx", "What time is it now?", "Read out the next news or message", or "Search for xxx", Case where the user utterance intention can be understood and an action depending on the user utterance intention is incapable of being executed unless the system (the information processing apparatus 100) outputs a response speech In such a case, the system (the information processing apparatus 100) is necessary to respond to the speech as an action based on the user utterance intention, and so it is determined that the system utterance is necessary to be stopped.

As described above, in step S152, the output (speech or image) control unit 110 is input with, in one example, the user utterance intention information from the utterance semantic analysis unit 104 and determines whether to stop the system utterance.

If it is determined that the system utterance is unnecessary to be stopped, the processing proceeds to step S153.

On the other hand, if it is determined that the system utterance is necessary to be stopped, the processing proceeds to step S171.

The processing in step S171 and subsequent steps in the case where it is determined that the system utterance is necessary to be stopped is now described.

(Steps S171 to S172)

If it is determined in step S152 that the system utterance is necessary to be stopped, the output (speech or image) control unit 110 performs, in step S171, the processing of immediately stopping the system utterance speech that is being currently output.

Further, in step S172, where a system response is made depending on the user utterance's intention.

The system response is executed as at least one of speech output or image output. In a case where speech is output, the speech synthesis unit 122 outputs speech information generated by speech synthesis processing (text-to-speech: TTS) through the speech output unit 123 such as a speaker.

In a case where an image is output as a response, the display image information generated by the display image synthesis unit 124 is output through the image output unit 125 such as a display.

Then, the processing in step S153 and subsequent steps in the case where it is determined in step S152 that the system utterance is unnecessary to be stopped is described.

(Step S153)

If it is determined in step S152 that the system utterance currently being output is unnecessary to be stopped, then the output (speech or image) control unit 110 determines the conditions in step S153 as follows:

(a) Whether to continue the system utterance currently being output, or (b) Whether to return to the uttered specific position of the system utterance currently being output and rephrase the system utterance It is determined which of (a) Continuation of system utterance or (b) Rephrasing of system utterance mentioned above is to be executed.

This determination processing is performed on the basis of a determination of whether or not an important word is included in the system utterance executed during the period from the start (fading start) of the user utterance (barge-in utterance) to the end of the user utterance (barge-in utterance) (i.e., from the start of the fade processing of the system utterance to the continuation period of maintaining the fading completion state (ducking)).

If an important word is included, it is determined as (b) Rephrasing of system utterance.

If no important word is included, it is determined as (a) Continuation of system utterance.

A specific example of the determination processing is now described.

The output (speech or image) control unit 110 first performs natural language analysis on the text of the system utterance executed during the period from the start (fading start) of the user utterance (barge-in utterance) to the end of the user utterance (barge-in utterance) (i.e., from the start of the fade processing of the system utterance to the continuation period of maintaining the fading completion state (ducking)). Then, the output (speech or image) control unit 110 extracts an important word in which information based on system utterance will not be correctly transmitted to the user if missed in the utterance.

Examples of the important word include the followings.

Proper nouns, dates, times, places, information of an amount of money, numeral, objects, objective cases, and the like, are determined as the important word.

Moreover, in addition to the above examples, the system (the information processing apparatus 100) can define in advance a word to be conveyed to the user as an important word in the utterance text by using a tag.

In the case where no important word is uttered in the system utterance executed during the period from the start (fading start) of the user utterance (barge-in utterance) to the end of the user utterance (barge-in utterance) (i.e., from the start of the fade processing of the system utterance to the continuation period of maintaining the fading completion state (ducking)), it is determined as (a) Continuation of system utterance.

On the other hand, if the important word is uttered during the period mentioned above, it is determined as (b) Rephrasing of system utterance.

If it is determined (a) Continuation of system utterance, the processing proceeds to step S154.

On the other hand, if it is determined as (b) Rephrasing of system utterance, the processing proceeds to step S155.

(Step S154)

If it is determined in step S153 that the system utterance is to be continued, the processing proceeds to step S154.

In step S154, the output (speech or image) control unit 110 returns the volume, pitch, and speech rate of the system utterance currently being output to the level before the fading and continues the utterance as it is.

(Step S154)

On the other hand, if it is determined in step S153 that the system utterance is to be rephrased, the processing proceeds to step S155.

In step S155, the output (speech or image) control unit 110 returns the volume, pitch, and speech rate of the system utterance being currently output to the level before the fading, returns it to the utterance position of the phrase including an initial important word in the important word search period mentioned above, that is, the important word search period after the start of the fade processing, and restarts the system utterance.

In the continuation of the system utterance or the rephrasing determination executed in step S153, the important word search period after the start of the fade processing is limited to the period from the start to the end of the user utterance.

In one example, in the case where the user utterance is short, the fading execution period of the system utterance is short, and the probability that an important word is included in the fading execution period is small.

Thus, in one example, in the case where the user utterance (barge-in utterance) is a short user utterance of a device operation request system without a speech response from the system (the information processing apparatus 100), the fading execution period of the system utterance is short, and is less likely to include an important word, and the system utterance is more likely to be continued.

In addition, even in the case where an important word is included in the phrase and rephrasing is necessary, the rephrasing section can be set to a minimum short section as the rephrase section and the system utterance can be restarted, thereby preventing the user from missing an important word.

(Step S156)

After the continuation of the system utterance in step S154 or the rephrasing of the system utterance in step S155, the processing proceeds to step S156.

In step S156, the information processing apparatus 100 executes processing corresponding to the user utterance (barge-in utterance).

In this processing, for example, in the case where the user utterance (barge-in utterance) is, in one example, the user utterance="Turn on the light", the information processing apparatus 100 executes, for example, the processing of outputting a control signal (such as Wi-fi or infrared ray) to an external device (a light fixture) to turn on the electric light.

5. Regarding Specific Processing Example Executed by the Output (Speech or Image) Control Unit A specific processing example executed by the output (speech or image) control unit 110 is now described with reference to FIG. 9.

The specific processing examples are sequentially described as follows:

(Processing Example 1) Processing example in which system utterance is necessary to be stopped due to long user utterance (barge-in utterance)

(Processing Example 2) Processing example in which system utterance is necessary to continue due to short user utterance (barge-in utterance)

(Processing Example 3) Processing example in which system utterance is necessary to be rephrased due to user utterance (barge-in utterance)

(Processing Example 1) Processing Example in which System Utterance is Necessary to be Stopped Due to Long User Utterance (Barge-in Utterance)

Figure 9:
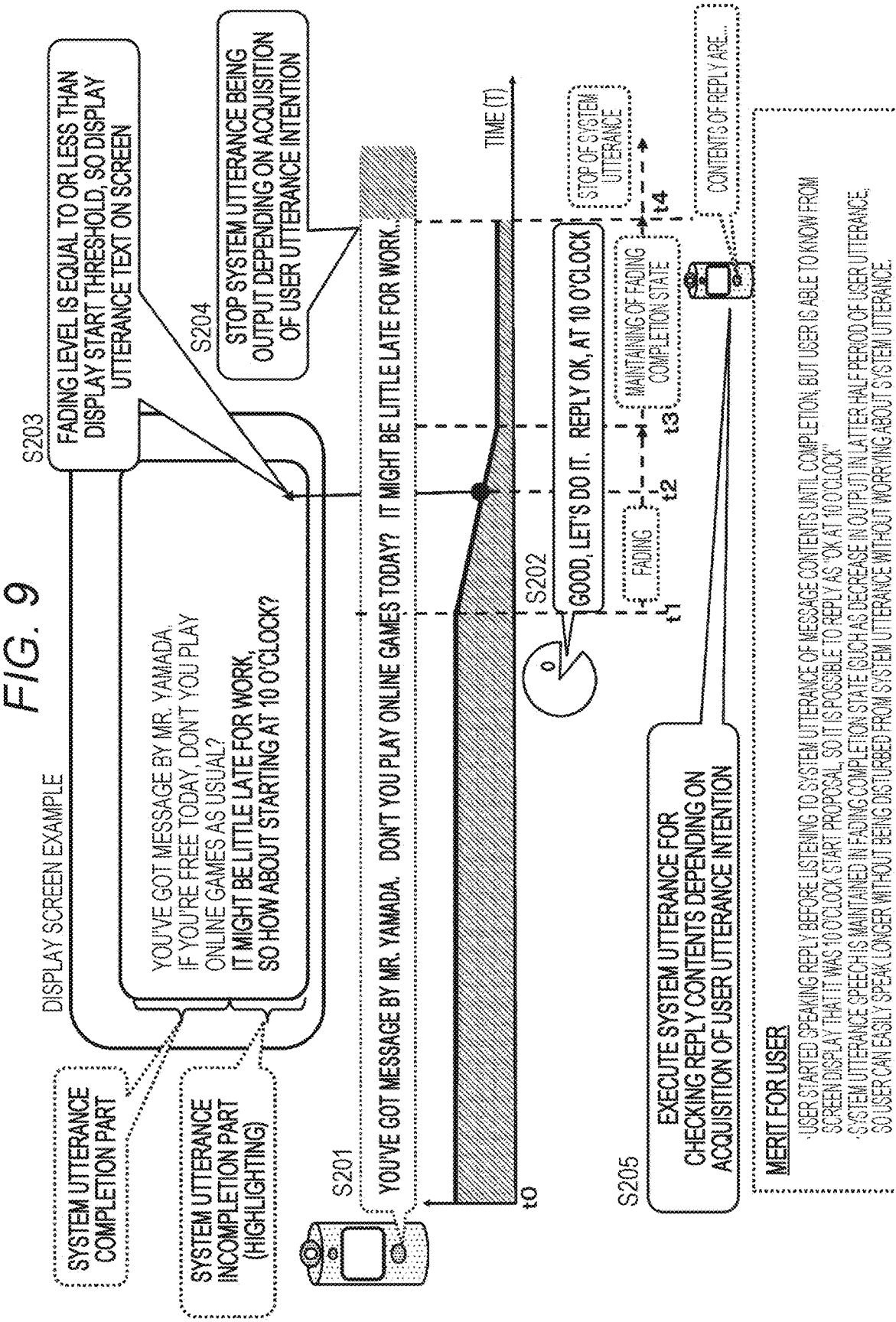
FIG. 9 is a diagram illustrated to describe a specific example of processing executed upon detecting user utterance (barge-in utterance) during executing system utterance.

With reference to FIG. 9, a description is now given of Processing Example 1, that is, a processing example in which the system utterance is necessary to be stopped due to long user utterance (barge-in utterance).

In the example shown in FIG. 9, first, in step S201, the information processing apparatus 100 starts the system utterance from time to, as follows:

System utterance=You've got a message by Mr. Yamada. Don't you play online games today? It might be a little late for work.

Then, in step S202, the user starts the user utterance (barge-in utterance) from time t1, as follows:

User utterance (barge-in utterance)=Good, let's do it. Reply OK, at 10 o'clock

The output (speech or image) control unit 110 of the information processing apparatus 100 starts the fade processing on the system utterance from time t1 at which the user utterance (barge-in utterance) is started.

Then, at time t2 during the period of executing the fade processing, the system utterance characteristic index value (Sv) (=calculated index value based on volume, speech rate, and pitch (voice pitch)) is set to a value equal to or less than a predefined threshold (system utterance display threshold (Th1), so the processing of displaying the system utterance on the display unit of the information processing apparatus is executed.

This is the processing of step S203 shown in FIG. 9.

Then, at time t3, the output (speech or image) control unit 110 ends the fade processing of the system utterance. However, the system utterance continues while maintaining the characteristics at the end of the fade processing.

Then, at time t4, the system (the information processing apparatus 100) completes the acquisition of the intention of the user utterance (barge-in utterance).

The output (speech or image) control unit 110 determines that an action depending on the user utterance intention fails to be executed unless the system (the information processing apparatus 100) outputs the response speech, and the system utterance being executed is stopped in response to this determination.

This is the processing of step S204 shown in FIG. 9.

Then, in step S205, the system (the information processing apparatus 100) executes an action depending on the intention of the user utterance (barge-in utterance).

In other words, the system response is output as follows:

System response=Contents of reply are . . . .

This system response is executed at the normal output level without fade processing.

The processing shown in FIG. 9 is an example of the processing in which the system utterance is necessary to be stopped due to long user utterance (barge-in utterance).

The merits of this processing example are as follows:

(1) The user is able to know from the screen display that it was a 10 o'clock start proposal even when the user starts speaking a reply before listening to the system utterance of the message contents until the end, so it is possible to perform the user utterance including time information corresponding to the system utterance of "OK at 10 o'clock" as the user utterance.

(2) The system utterance speech is maintained in the fading completion state (such as a decrease in output) in the latter half period of the user utterance, so the user can easily speak without being disturbed from longer utterance and without worrying about the system utterance.

(Processing Example 2) Processing Example in which System Utterance is Necessary to Continue Due to Short User Utterance (Barge-in Utterance)

Subsequently, with reference to FIG. 10, a description is given of Processing Example 2, that is, a processing example in which short user utterance (barge-in utterance) enables continuation of the system utterance.

In the example shown in FIG. 10, first, in step S221, the information processing apparatus 100 starts the system utterance from time to, as follows:

System utterance=You've got an email by Mr. Sato. Photos of previous trip are attached. It was so much fun, so let's go again all together . . . .

Then, in step S222, the user starts the user utterance (barge-in utterance) from time t1, as follows:

User utterance (barge-in utterance)=Show me photos

The output (speech or image) control unit 110 of the information processing apparatus 100 starts the fade processing on the system utterance from time t1 at which the user utterance (barge-in utterance) is started.

Then, at time t2 during the period of executing the fade processing, the system (the information processing apparatus 100) completes the acquisition of the intention of the user utterance (barge-in utterance).

In step S223, the output (speech or image) control unit 110 determines that the action depending on the user utterance intention is executable without outputting the response speech by the system (the information processing apparatus 100), executes the action depending on the user utterance intention in response to the determination, and further continues the system utterance being executed.

In the continuation processing, the output (speech or image) control unit 110 performs the processing of returning the system utterance being executed to the level before the fade processing.

In other words, the system utterance is returned to the volume, speech rate, and pitch (voice pitch) of the system utterance before the fade processing, and the system utterance is continued.

Moreover, the action depending on the intention of the user utterance executed by the information processing apparatus 100 in step S223 is the processing of displaying a photo on the image output unit (display unit) 125 of the information processing apparatus 100.

Figure 10:
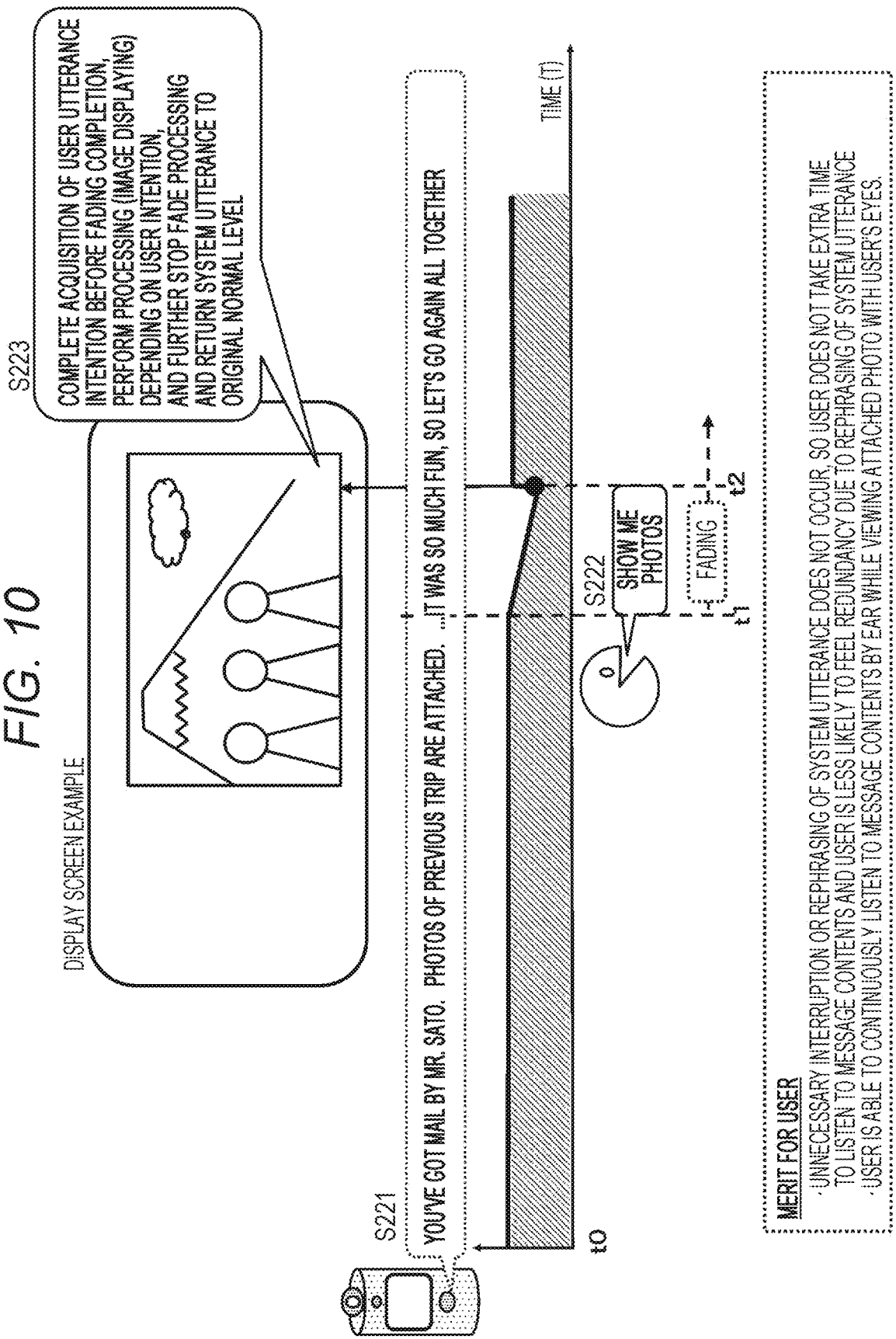
FIG. 10 is a diagram illustrated to describe a specific example of processing executed upon detecting user utterance (barge-in utterance) during executing system utterance.

The processing shown in FIG. 10 is an example of the processing in which the continuation of the system utterance is enabled by the short user utterance (barge-in utterance).

The merits of this processing example are as follows:

(1) Unnecessary suspension or rephrasing of the system utterance does not occur, so the user does not take extra time to listen to the message contents and the user is less likely to feel the redundancy due to the rephrasing of the system utterance.

(2) The user is able to continuously listen to the message contents by ear while viewing the attached photo with the user's eyes.

(Processing Example 3) Processing Example in which System Utterance is Necessary to be Rephrased Due to User Utterance (Barge-in Utterance)

Subsequently, with reference to FIG. 11, a description is given of Processing Example 3, that is, a processing example in which the system utterance is necessary to be rephrased by the user utterance (barge-in utterance).

In the example shown in FIG. 11, first, in step S241, the information processing apparatus 100 starts the system utterance from time to, as follows:

System utterance=You've got an email by Mr. Suzuki. Photos of yesterday's drinking party are attached. Membership fee is 4000 yen . . . .

Then, in step S242, the user starts the user utterance (barge-in utterance) from time t1, as follows:

User utterance (barge-in utterance)=Show me photos

The output (speech or image) control unit 110 of the information processing apparatus 100 starts the fade processing on the system utterance from time t1 at which the user utterance (barge-in utterance) is started.

Then, at time t2 during the period of executing the fade processing, the system (the information processing apparatus 100) completes the acquisition of the intention of the user utterance (barge-in utterance).

In step S243a, the output (speech or image) control unit 110 determines that the action depending on the user utterance intention is executable without outputting the response speech by the system (the information processing apparatus 100), and executes the action depending on the user utterance intention in response to the determination.

The action depending on the intention of the user utterance executed by the information processing apparatus 100 is the processing of displaying a photo on the image output unit (display unit) 125 of the information processing apparatus 100.

Furthermore, in step S243b, the output (speech or image) control unit 110 starts the processing of rephrasing the system utterance during executing the fade processing.

This rephrasing processing starts with the phrase including the important word after the start of the fade processing=4000 yen.

In addition, at the time of rephrasing processing of the system utterance, the output (speech or image) control unit 110 performs the processing of returning the system utterance to the level before the fade processing.

In other words, the system utterance is rephrased by returning to the volume, the speech rate, and the pitch (voice pitch) of the system utterance before the fade processing.

Figure 11:
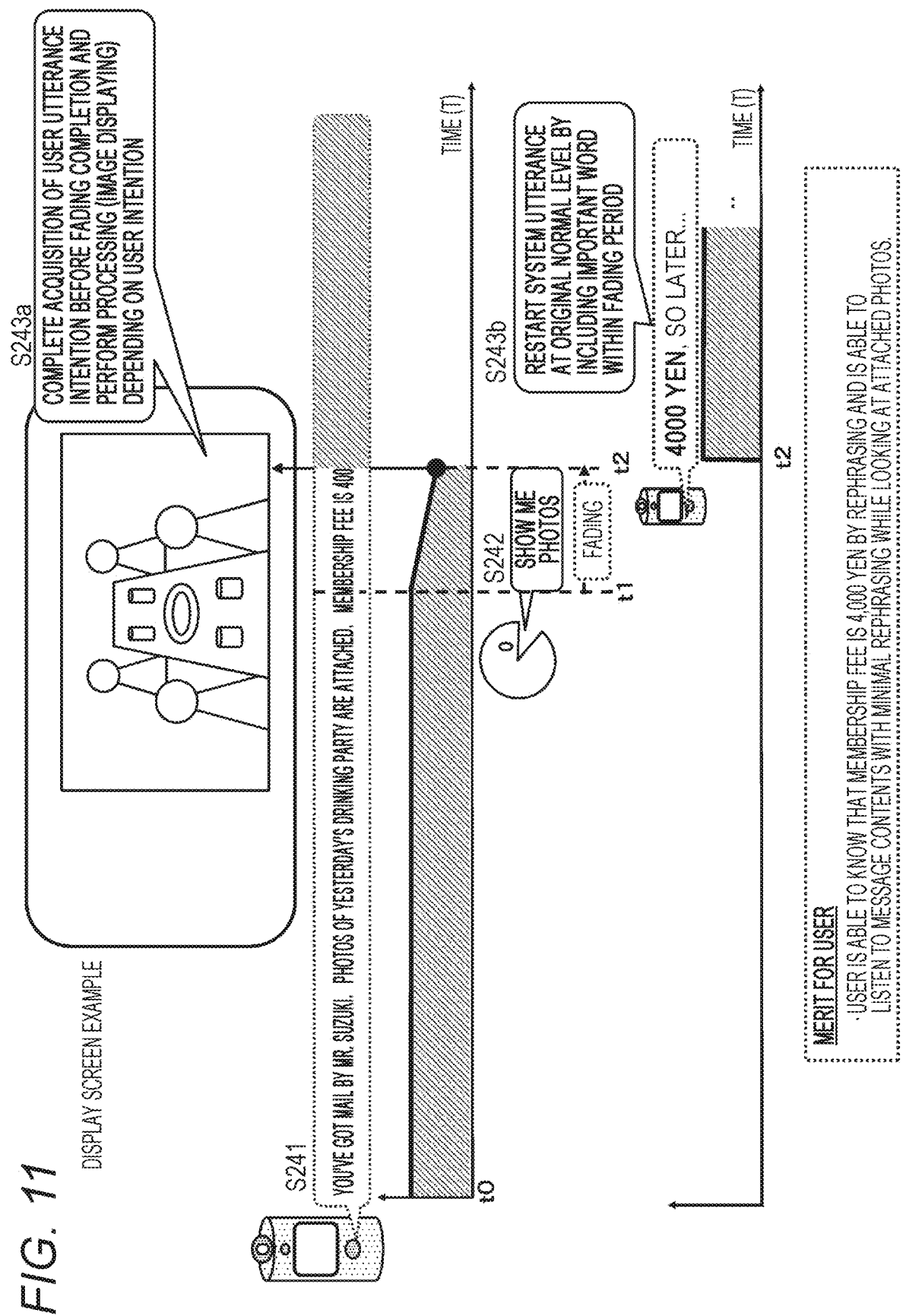
FIG. 11 is a diagram illustrated to describe a specific example of processing executed upon detecting user utterance (barge-in utterance) during executing system utterance.

The processing shown in FIG. 11 is an example of processing in which the system utterance is necessary to be rephrased by the user utterance (barge-in utterance).

The merits of this processing example are as follows:

(1) The user is able to know that the membership fee is 4,000 yen by rephrasing and is able to listen to the contents of the message with minimal rephrasing while looking at the attached photo.

6. Regarding Other Configuration Examples

Other configuration examples different from the above-described embodiment are now described.

Six configuration examples of (1) to (6) are sequentially described below.

(1) Configuration of displaying the continuation of the system utterance on the display unit of the information processing apparatus without disturbing the barge-in utterance that is the user interrupt utterance to the system utterance In one example, in the case where the display area of the display unit of the information processing apparatus is small, or the like, it is possible to display only the extracted important word as an important word instead of displaying the entire text of the system utterance on the display unit.

(2) Configuration using detection information other than detection of user utterance speech (detection of start of user utterance) as a fading start condition of system utterance As the fading start condition of the system utterance, in addition to the detection of the user utterance speech (detection of the start of the user utterance), the detection as to whether or not the line-of-sight or face of the uttering user is looking at the system (the information processing apparatus 100) is performed using the input image of the image input unit 105 or the detection information obtained by the sensor 107.

The output (speech or image) control unit 110 detects that the user utterance (barge-in utterance) has been started on the basis of the detection information mentioned above, and can start the fade processing of the system utterance.

Furthermore, the start determination of the user utterance (barge-in utterance) based on the use status of an external device capable of communicating with the system (the information processing apparatus 100) can be performed.

In one example, the fade processing is started only when the user utterance speech is detected and the user is looking at the system (the information processing apparatus 100).

On the other hand, the fade processing is not started, in a case where the user utterance speech is detected, the user is not facing the system (the information processing apparatus 100), but facing another person.

In addition, the fade processing is not started in a case where the user utterance speech is detected, the user is not talking to the system (the information processing apparatus 100), but is talking with another interactive device or on the phone.

Furthermore, in the state maintaining the fading completion state (ducking state) after the completion of the fade processing, even if the user utterance continues, the system utterance can be stopped at the end of the sentence or the end of the intonation phrase.

(3) Processing at the time of barge-in in the case where the speech output unit 123 of system utterance is used as a device worn on the user's ear such as headphones The speech output unit 123 of the information processing apparatus 100 is also capable of being configured as headphones or earphones worn on the user's ear.

In this case, in the case where the user utterance (barge-in utterance) occurs, the noise canceling control can be performed in conjunction with or instead of the above-described fade processing, that is, the control processing of volume, speech rate, and pitch.

In one example, in the case where the user utterance (barge-in utterance) occurs, the processing of gradually weakening the noise canceling function is performed.

This processing allows the surrounding environmental sound to be gradually heard during the user utterance and allows the user to speak while recognizing whether the loudness of the user's speech is appropriate for the surrounding environment (whether or not it is uttering too loud).

Furthermore, in the case where the user utterance (barge-in utterance) occurs, the sound source direction control of moving gradually the position of the system utterance speech input through a headphone or earphone from the front position, which is the normal position, to the side through the back from the front can be set to be performed.

This control makes it easier for the user to speak because the sound image of the system utterance is no longer in the front.

(4) Upon detecting the user utterance, delaying of the start of the fade processing of the system utterance to the end of a phrase that is the semantic sequences of the contents of the system utterance can be performed.

(5) In a case where the system utterance is suspended by the user utterance (barge-in utterance), the contents of the system utterance can be transferred to a smartphone or a PC using email or a message for the user to check it later.

Moreover, the utterance contents to be transferred are preferably set in such a way that the speech output completion part and the speech output incompletion part of the system utterance can be discriminated as described above with reference to FIG. 8.

In one example, it is possible to make it identifiable by color code with a rich text tag.

(6) Contents of the user utterance can be displayed on the display unit of the information processing apparatus 100 for confirmation when the system responds to the user utterance after the system utterance is stopped.

Figure 12:
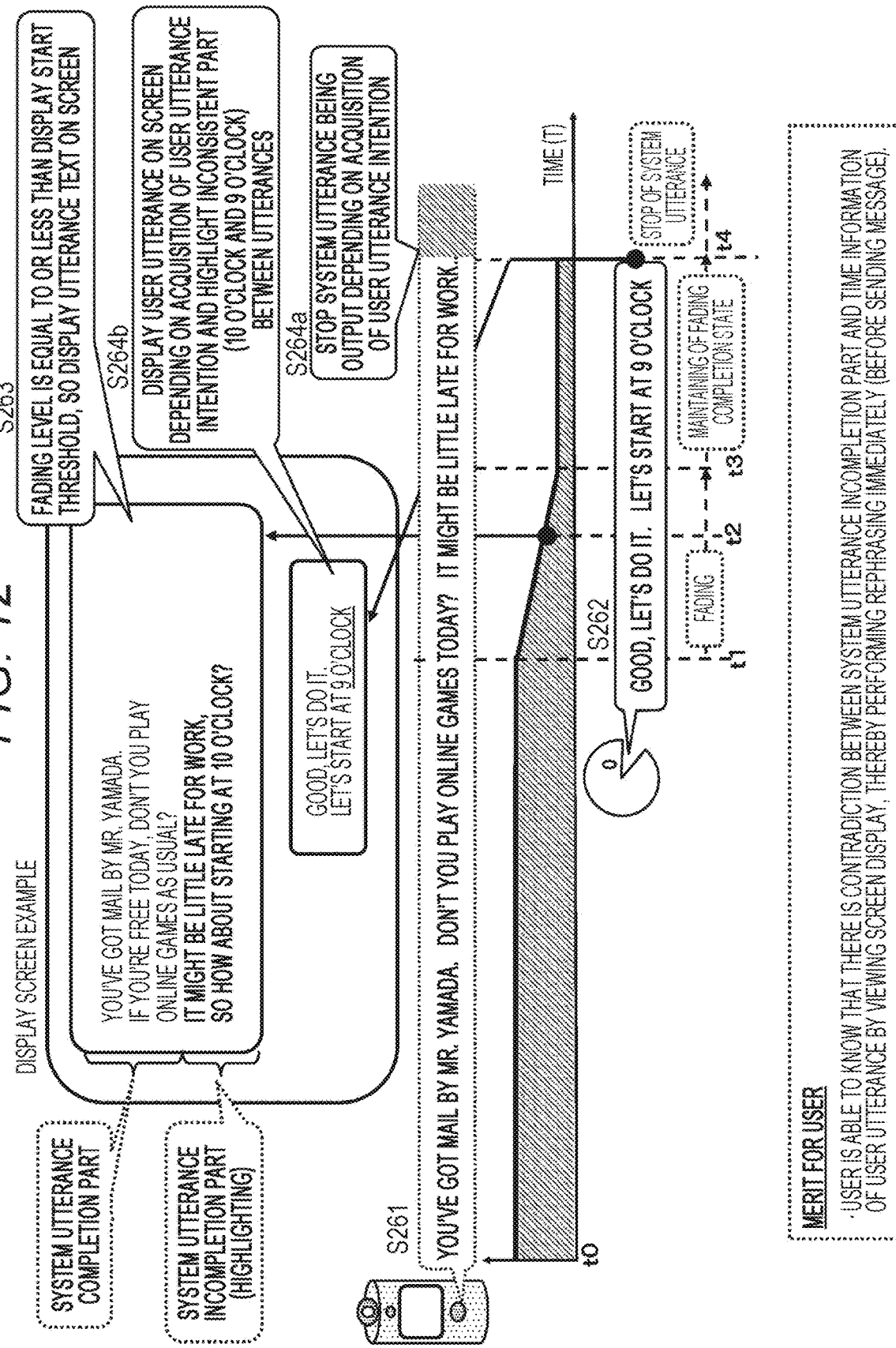
FIG. 12 is a diagram illustrated to describe a specific example of processing executed upon detecting user utterance (barge-in utterance) during executing system utterance.

The specific example thereof is shown in FIG. 12. The example shown in FIG. 12 is a modification of the example described above with reference to FIG. 9, that is, (Processing Example 1) Processing example in which system utterance is necessary to be stopped due to long user utterance (barge-in utterance).

The processing of steps S261 to S264a shown in FIG. 12 is substantially similar to the processing of steps S201 to S204 shown in FIG. 9.

In other words, the processing of steps S261 to S264a shown in FIG. 12 is the processing as follows:

First, in step S261, the information processing apparatus 100 starts the system utterance from time to, as follows:

System utterance=You've got a message by Mr. Yamada. Don't you play online games today? It might be a little late for work . . . . What about starting at 10 o'clock?

Then, in step S262, the user starts the user utterance (barge-in utterance) from time t1, as follows:

User utterance (barge-in utterance)=Good, let's do it. Let's start at 9 o'clock.

The output (speech or image) control unit 110 of the information processing apparatus 100 starts
the fade processing on the system utterance from time t1 at which the user utterance (barge-in utterance) is started.

Then, at time t2 during the period of executing the fade processing, the system utterance characteristic index value (Sv) (=calculated index value based on volume, speech rate, and pitch (voice pitch)) is set to a value equal to or less than a predefined threshold (system utterance display threshold (Th1), so the processing of displaying the system utterance on the display unit of the information processing apparatus is executed.

This is the processing of step S263 shown in FIG. 12.

Then, at time t3, the output (speech or image) control unit 110 ends the fade processing of the system utterance. However, the system utterance continues while maintaining the characteristics at the end of the fade processing.

Then, at time t4, the system (the information processing apparatus 100) completes the acquisition of the intention of the user utterance (barge-in utterance).

The output (speech or image) control unit 110 determines that an action depending on the user utterance intention fails to be executed unless the system (the information processing apparatus 100) outputs the response speech, and the system utterance being executed is stopped in response to this determination.

This is the processing of step S264a shown in FIG. 12.

Furthermore, in step S264b shown in FIG. 12, the output (speech or image) control unit 110 displays the contents of the user utterance on the display unit of the information processing apparatus 100.

In performing this display processing, the inconsistency (contradiction) between the system utterance and the user utterance (barge-in utterance) is highlighted.

In the example shown in FIG. 12,
the parts, which are highlighted, corresponding to the inconsistency (contradiction) between the system utterance and the user utterance (barge-in utterance) are as follows:

"10 o'clock" during system utterance,

"9 o'clock" during user utterance (barge-in utterance)

The user is able to check a part where the user utterance does not match the system utterance while viewing both the system utterance contents appearing on the screen and the user own user utterance contents.

As a result, it is easier to rephrase as necessary.

Moreover, the information processing apparatus 100 determines whether there is any inconsistency between the entire contents including the unuttered part of the system utterance and the contents of the user utterance using language analysis, and if there is any inconsistency, the system can point out.

In one example, if the user responds to go at 9 o'clock to the invitation message at 10 o'clock (the unuttered part), the system utterance is output as follows:

System utterance="10 o'clock invitation, how about 9 o'clock?"

Such system utterance can be performed to request the user to check again.

7. Effect of Processing Executed by Information Processing Apparatus of Present Disclosure The effect of the processing executed by the information processing apparatus of the present disclosure is now described.

The effect of the processing executed by the information processing apparatus 100 of the present disclosure includes those, in one example, as follows:

(1) Upon starting the user utterance, for the system utterance, the fade processing is immediately performed, that is, Decrease gradually the volume of system utterance Slow down gradually the rate of system utterance Lower gradually the pitch (voice pitch) of system utterance At least one of the processing mentioned above is started, so the user is able to know at an early stage that the system (the information processing apparatus 100) accepts the user utterance.

(2) In the case where the user performs longer user utterance (barge-in utterance), the system utterance of the system (the information processing apparatus 100) is set to a state in which the fading completion state is maintained after the fade processing (ducking state), preventing the user utterance from being disturbed.

(3) If the user utterance (barge-in utterance) is short request utterance from the user or short utterance that is not directed to the system (the information processing apparatus 100), the system utterance continues without being suspended, which does not cause unnecessary suspension or rephrasing, resulting in no time loss.

(4) In the case where the user utterance (barge-in utterance) occurs, if the system utterance is faded to a level that is difficult for the user to hear, the system utterance contents are displayed on the display unit of the system (the information processing apparatus 100), allowing the user to check it even when important contents are included in the part after the fading of the system utterance.

(5) The system utterance is stopped (silenced) after the fade processing or the subsequent fade processing completion state (ducking state), so noise due to silence is less likely to occur without causing the user to feel uncomfortable.

8. Regarding Configuration Examples of Information Processing Apparatus and Information Processing System Although the plurality of embodiments has been described, the various processing functions described in these embodiments, for example, all the processing functions of the respective constituent elements of the information processing apparatus 100 illustrated in FIG. 5 can be also configured within one apparatus, for example, an agent device owned by a user, or an apparatus such as a smartphone and a PC, and some of the functions can be also configured to be executed in a server or the like.

Figure 13:
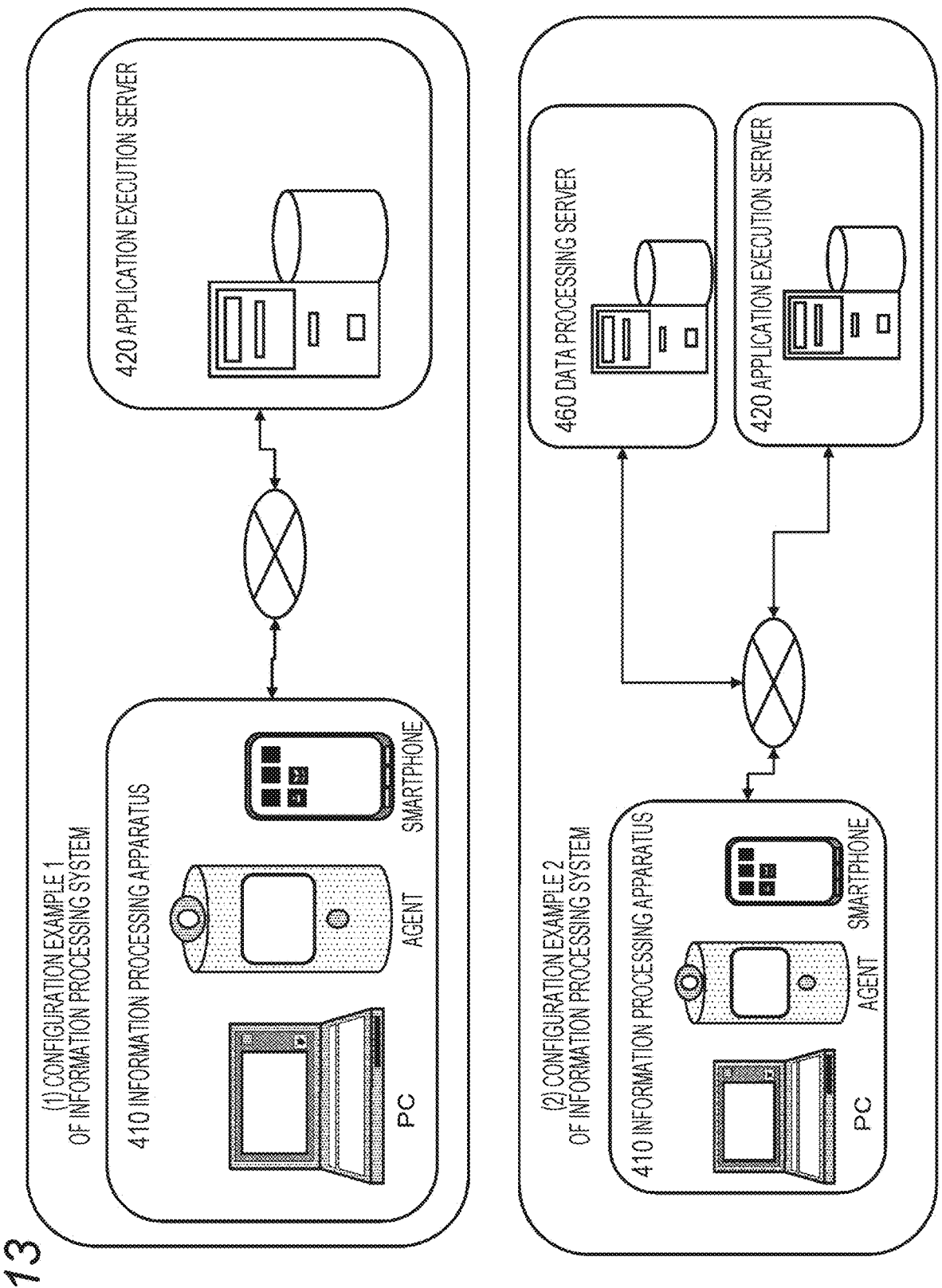
FIG. 13 is a diagram illustrated to describe a configuration example of an information processing system.

FIG. 13 illustrates a system configuration example.

Information processing system configuration example 1 in FIG. 13(1) is an example in which almost all the functions of the information processing apparatus illustrated in FIG. 5 are configured within one apparatus, for example, an information processing apparatus 410 which is a user terminal such as a smartphone or a PC owned by a user and an agent device having speech input/output and image input/output functions.

The information processing apparatus 410 corresponding to the user terminal executes communication with an application execution server 420 only in the case of using, for example, an external application at the time of generating a response sentence.

The application execution server 420 is, for example, a weather information providing server, a traffic information providing server, a medical information providing server, a sightseeing information providing server, or the like, and is constituted by a server group which can provide information to generate a response to a user utterance.

On the other hand, Information Processing System Configuration Example 2 in FIG. 13(2) is a system example in which some of the functions of the information processing apparatus illustrated in FIG. 5 are configured within the information processing apparatus 410, which is the user terminal such as the smartphone or the PC owned by the user, and the agent device, and the other functions are configured to be executed in a data processing server 460 capable of communicating with the information processing apparatus.

For example, it is possible to configured such that only the speech input unit 101, the image input unit 105, the sensor 107 the speech output unit 123, and the image output unit 125 in the apparatus illustrated in FIG. 5 are provided on the information processing apparatus 410 side of the user terminal, and all the other functions are executed on the server side, or the like.

Specifically, in one example, the system configuration can be constructed as follows.

The user terminal is provided with the output control unit that starts the fade processing for lowering at least one of the volume, the speech rate, or the pitch (voice pitch) of the system utterance from the starting time of the barge-in utterance that is the user interruption utterance during executing the system utterance.

On the other hand, the data processing server is provided with the utterance intention analysis unit that analyzes the intention of the barge-in utterance received from the user terminal.

The output control unit of the user terminal determines whether or not the system utterance is necessary to be stopped on the basis of the intention of the barge-in utterance received from the server, and if it is determined that the system utterance is necessary to be stopped, then the system utterance is stopped. On the other hand, if it is determined that the system utterance is unnecessary to be stopped, depending on whether or not an important word is included in the system utterance after the fade processing, it is determined which of (a) and (b) below is to be executed, and processing based on the result of the determination is executed:

(a) Return to the state before the fade processing and continue the output (b) Return to the state before the fade processing and execute the rephrasing processing In one example, such a configuration is possible.

Note that various different settings are possible as a function division mode of functions on the user terminal side and functions on the server side. Furthermore, a configuration in which one function is executed on both the sides is also possible.

9. Regarding Hardware Configuration Examples of Information Processing Apparatus Next, a hardware configuration example of the information processing apparatus will be described with reference to FIG. 14.

The hardware to be described with reference to FIG. 14 is an example of a hardware configuration of the information processing apparatus that has been described above with reference to FIG. 5, and is an example of a hardware configuration of an information processing apparatus constituting the data processing server 460 that has been described with reference to FIG. 13.

A central processing unit (CPU) 501 functions as a control unit or a data processing unit that executes various processes according to a program stored in a read only memory (ROM) 502 or a storage unit 508. For example, the processing according to the sequence described in the above-described embodiments is performed. The program to be executed by the CPU 501, data, and the like are stored in a random access memory (RAM) 503. The CPU 501, the ROM 502, and the RAM 503 are mutually connected via a bus 504.

The CPU 501 is connected to an input/output interface 505 via the bus 504 and an input unit 506 including various switches, a keyboard, a mouse, a microphone, a sensor, and the like, and an output unit 507 including a display, a speaker, and the like are connected to the input/output interface 505. The CPU 501 executes various processes in response to an instruction input from the input unit 506, and outputs processing results to, for example, the output unit 507.

The storage unit 508 connected to the input/output interface 505 is configured using, for example, a hard disk and the like, and stores a program to be executed by the CPU 501 and various types of data. A communication unit 509 functions as a transmission/reception unit of Wi-Fi communication, Bluetooth (registered trademark) (BT) communication, and other data communication via a network such as the Internet and a local area network, and communicates with an external apparatus.

A drive 510 connected to the input/output interface 505 drives removable media 511 such as a magnetic disk, an optical disk, a magneto-optical disk, and a semiconductor memory such as a memory card, and executes data recording or reading.

10. Summary of Configuration of Present Disclosure

The embodiments of the present disclosure have been described in detail with reference to the specific embodiments. However, it is self-evident that those skilled in the art can make modifications and substitutions of the embodiments within a scope not departing from a gist of the present disclosure. In other words, the present invention has been disclosed in the form of exemplification, and should not be interpreted restrictively. In order to determine the gist of the present disclosure, the scope of claims should be taken into consideration.

Moreover, the technology disclosed in the specification herein may include the following configuration.

(1) An information processing apparatus including an output control unit configured to start fade processing of lowering at least one of volume, a speech rate, or a pitch (voice pitch) of system utterance from a starting time of barge-in utterance acting as user interruption utterance during executing the system utterance.

(2) The information processing apparatus according to (1), further including:

a speech utterance section detection unit that has a voice activity detection (VAD) function, in which the output control unit starts the fade processing from the starting time of the barge-in utterance decided on the basis of detection information of the speech utterance section detection unit.

(3) The information processing apparatus according to (1) or (2), in which the output control unit continues the fade processing for a predetermined specified time and, after a lapse of the specified time, maintains an output state of the system utterance at a time of completion of the fade processing.

(4) The information processing apparatus according to any one of (1) to (3), in which the output control unit causes the system utterance to be displayed on a display unit in a case where a characteristic index value of the system utterance is equal to or less than a predefined threshold during executing the fade processing.

(5) The information processing apparatus according to (4), in which the threshold corresponds to a level at which the system utterance is difficult for a user to hear.

(6) The information processing apparatus according to (4) or (5), in which the output control unit causes the system utterance to be displayed on the display unit to be displayed in such a manner to make the system utterance identifiable as a system utterance completion part and a system utterance incompletion part.

(7) The information processing apparatus according to any one of (1) to (6), in which the output control unit determines whether or not the system utterance is necessary to be stopped on the basis of the barge-in utterance's intention and, in a case of determining that the system utterance is necessary to be stopped, stops the system utterance.

(8) The information processing apparatus according to any one of (1) to (7), in which the output control unit stops the system utterance in a case of determining that a system response speech output is necessary as a system action corresponding to the barge-in utterance's intention.

(9) The information processing apparatus according to any one of (1) to (8), in which the output control unit determines whether or not the system utterance is necessary to be stopped on the basis of the barge-in utterance's intention, and performs, in a case of determining that the system utterance is unnecessary to be stopped, processing of determining which of (a) returning the system utterance to a state before the fade processing and continuing an output or (b) returning the system utterance to the state before the fade processing and executing rephrasing processing is to be executed.

(10) The information processing apparatus according to (9), in which the output control unit determines whether or not an important word is included in the system utterance after the start of the fade processing within a period from a start to an end of the barge-in utterance, and performs, in a case where the important word is not included, (a) returning to the state before the fade processing and continuing an output and, in a case where the important word is included, (b) returning to the state before the fade processing and executing the rephrasing processing.

(11) The information processing apparatus according to (10), in which the output control unit, in a case of performing (b) returning to the state before the fade processing and executing the rephrasing processing, starts the rephrasing processing from an utterance position of a phrase including an initial important word of the system utterance after the start of the fade processing.

(12) The information processing apparatus according to (10) or (11), in which the important word is one of words indicating a proper noun, date, time, a place, information of an amount of money, numerals, an object, and an objective case.

(13) The information processing apparatus according to any one of (1) to (12), in which the output control unit, in a case where a characteristic index value of the system utterance is equal to or less than a predefined threshold during executing the fade processing, causes the system utterance to be displayed on a display unit and concurrently causes the barge-in utterance to be displayed on the display unit.

(14) The information processing apparatus according to (13), in which the output control unit executes processing of highlighting a contradictory part between the system utterance and the barge-in utterance.

(15) An information processing system including: a user terminal; and a data processing server, in which the user terminal includes an output control unit configured to start fade processing of lowering at least one of volume, a speech rate, or a pitch (voice pitch) of system utterance from a starting time of barge-in utterance acting as user interruption utterance during executing the system utterance, the data processing server includes an utterance intention analysis unit configured to analyze intention of the barge-in utterance received from the user terminal, the output control unit of the user terminal determines whether or not the system utterance is necessary to be stopped on the basis of the barge-in utterance's intention and, in a case of determining that the system utterance is necessary to be stopped, stops the system utterance, and performs, in a case of determining that the system utterance is unnecessary to be stopped, depending on whether or not there is an important word in the system utterance after the fade processing, processing of determining which of (a) returning the system utterance to a state before the fade processing and continuing an output or (b) returning the system utterance to the state before the fade processing and executing rephrasing processing is to be executed.

(16) The information processing system according to (15), in which the output control unit of the user terminal determines whether or not the important word is included in the system utterance after the start of the fade processing within a period from a start to an end of the barge-in utterance, and Performs, in a case where the important word is not included, (a) returning to a state before the fade processing and continuing an output and, in a case where the important word is included, (b) returning to the state before the fade processing and executing the rephrasing processing.

(17) An information processing method executed in an information processing apparatus including:

an output control unit configured to execute output control for starting fade processing of lowering at least one of volume, a speech rate, or a pitch (voice pitch) of system utterance from a starting time of barge-in utterance acting as user interruption utterance during executing the system utterance.

(18) An information processing method executed in an information processing system including: a user terminal; and a data processing server, in which the user terminal executes output control for starting fade processing of lowering at least one of volume, a speech rate, or a pitch (voice pitch) of system utterance from a starting time of barge-in utterance acting as user interruption utterance during executing the system utterance, the data processing server executes utterance intention analysis for analyzing intention of the barge-in utterance received from the user terminal, the user terminal includes an output control unit configured to determine whether or not the system utterance is necessary to be stopped on the basis of the barge-in utterance's intention and, in a case of determining that the system utterance is necessary to be stopped, stops the system utterance, and performs, in a case of determining that the system utterance is unnecessary to be stopped, depending on whether or not there is an important word in the system utterance after the fade processing, processing of determining which of (a) returning to a state before the fade processing and continuing an output or (b) returning to the state before the fade processing and executing rephrasing processing is to be executed.

(19) A program causing an information processing apparatus to execute information processing of:

causing an output control unit to execute output control for starting fade processing of lowering at least one of volume, a speech rate, or a pitch (voice pitch) of system utterance from a starting time of barge-in utterance acting as user interruption utterance during executing the system utterance.

Further, the series of processing described in the specification can be executed by hardware, software, or a complex configuration of the both. In a case where the processing is executed using software, it is possible to execute the processing by installing a program recording a processing sequence on a memory in a computer built into dedicated hardware or by installing a program in a general-purpose computer that can execute various processes. For example, the program can be recorded in a recording medium in advance. In addition to installing on a computer from the recording medium, it is possible to receive a program via a network, such as a local area network (LAN) and the Internet, and install the received program on a recording medium such as a built-in hard disk.

Note that various processes described in the specification not only are executed in a time-series manner according to the description but also may be executed in parallel or separately depending on the processing performance of an apparatus that executes the process or need. Furthermore, the term "system" in the present specification refers to a logical set configuration of a plurality of apparatuses, and is not limited to a system in which apparatuses of the respective configurations are provided in the same housing.

INDUSTRIAL APPLICABILITY

As described above, the configuration of an embodiment according to the present disclosure allows achieving an apparatus and a method, capable of controlling an output of the system utterance upon the occurrence of the barge-in utterance to enable a smooth interactive between the user and the system.

Specifically, in one example, fade processing is performed to lower at least one of volume, a speech rate, or a pitch (voice pitch) of the system utterance from the starting time of the barge-in utterance that is the user interruption utterance during executing the stem utterance. Even after the completion of the fade processing, the output state upon completing the fade processing is maintained. In a case where the system utterance level is equal to or less than the predefined threshold during the fade processing, the system utterance is displayed on a display unit. Furthermore, one of stop, continuation, and rephrasing of the system utterance is executed on the basis of the intention of the barge-in utterance and whether or not an important word is included in in the system utterance.

The present configuration allows achieving the apparatus and method capable of controlling an output of the system utterance upon the occurrence of the barge-in utterance to enable a smooth interactive between the user and the system.

REFERENCE SIGNS LIST

10 Information processing apparatus
11 Camera
12 Microphone
13 Display unit
14 Speaker
20 Server
30 External device
100 Information processing apparatus
101 Speech input unit
102 Speech utterance section detection unit
103 Speech recognition unit
104 Utterance semantic analysis unit
105 Image input unit
106 Image recognition unit
107 Sensor
108 Sensor information analysis unit
110 Output (speech or image) control unit
121 Response generation unit
122 Speech synthesis unit
123 Speech output unit
124 Display image generation unit
125 Image output unit
410 Information processing apparatus
420 Application execution server
460 Data processing server
501 CPU
502 ROM
503 RAM
504 Bus
505 Input/output interface
506 Input unit
507 Output unit
508 Storage unit
509 Communication unit
510 Drive
511 Removable media

The invention claimed is:

1. An information processing apparatus comprising:
a microphone;
a speaker;
a display; and
processing circuitry configured to
perform a speech synthesis process to change text information to speech information,
control the speaker to output the speech information as system utterance,
receive, via the microphone, barge-in utterance, which is interruption utterance by a user,
in response to receiving the barge-in utterance while the system utterance is outputted by the speaker, start fade processing of lowering at least one of volume, a speech rate, or a pitch of the system utterance by controlling the speaker, determine whether the at least one of the volume, the speech rate, or the pitch of the system utterance has become equal to or less than a predefined threshold by the fade processing, and
in response determining that the at least one of the volume, the speech rate, or the pitch of the system utterance has become equal to or less than the predefined threshold by the fade processing, control the display to display the text information corresponding to the system utterance in such a manner to distinguish between a part of the text information that has been outputted by the speaker and another part of the text information that has not yet been outputted by the speaker, wherein
the processing circuitry is further configured to
compare the text information and the barge-in utterance,
identify a contradictory part between the text information and the barge-in utterance, and
control the display to highlight the contradictory part in the text information.

2. The information processing apparatus according to claim 1, wherein
the processing circuitry has a voice activity detection (VAD) function, and starts the fade processing from a starting time of the barge-in utterance decided on a basis of the VAD function.

3. The information processing apparatus according to claim 1, wherein the processing circuitry continues the fade processing for a predetermined specified time and, after a lapse of the specified time, maintains an output state of the system utterance at a time of completion of the fade processing.

4. The information processing apparatus according to claim 1, wherein the threshold corresponds to a level at which the system utterance is difficult for a user to hear.

5. The information processing apparatus according to claim 1, wherein the processing circuitry determines
whether or not the system utterance is necessary to be stopped on a basis of the barge-in utterance's intention and, in a case of determining that the system utterance is necessary to be stopped, stops the system utterance.

6. The information processing apparatus according to claim 1, wherein the processing circuitry stops the system utterance in a case of determining that a system response speech output is necessary as a system action corresponding to the barge-in utterance's intention.

7. The information processing apparatus according to claim 1, wherein the processing circuitry:
determines whether or not the system utterance is necessary to be stopped on a basis of the barge-in utterance's intention, and
performs, in a case of determining that the system utterance is unnecessary to be stopped, processing of determining which of
(a) returning the system utterance to a state before the fade processing and continuing an output, or
(b) returning the system utterance to the state before the fade processing and executing rephrasing processing is to be executed.

8. The information processing apparatus according to claim 7, wherein the processing circuitry:
determines whether or not an important word is included in the system utterance after the start of the fade processing within a period from a start to an end of the barge-in utterance, and
performs,
in a case where the important word is not included,
(a) returning to the state before the fade processing and continuing an output, and in a case where the important word is included,
(b) returning to the state before the fade processing and executing the rephrasing processing.

9. The information processing apparatus according to claim 8, wherein the processing circuitry, in a case of performing (b) returning to the state before the fade processing and executing the rephrasing processing,
starts the rephrasing processing from an utterance position of a phrase including an initial important word of the system utterance after the start of the fade processing.

10. The information processing apparatus according to claim 8, wherein the important word is one of words indicating a proper noun, date, time, a place, information of an amount of money, numerals, an object, and an objective case.

11. The information processing apparatus according to claim 1, wherein the processing circuitry,
in response determining that the at least one of the volume, the speech rate, or the pitch of the system utterance has become equal to or less than the predefined threshold by the fade processing, control the display to display the text information corresponding to the system utterance, and the barge-in utterance.

12. The information processing apparatus according to claim 1, wherein the processing circuitry is configured to:
in response determining that the at least one of the volume, the speech rate, or the pitch of the system utterance has become equal to or less than the predefined threshold by the fade processing, control the display to display the text information corresponding to the system utterance in such a manner to highlight the another part of the text information that has not yet been outputted by the speaker, and not highlight the part of the text information that has been outputted by the speaker.

13. The information processing apparatus according to claim 12, wherein the processing circuitry is configured to highlight the another part of the text information that has not yet been outputted by the speaker, by changing the another part of the text information to be bold.

14. The information processing apparatus according to claim 1, wherein the processing circuitry is configured to control the display to highlight the contradictory part in the text information by underlining the contradictory part.

15. The information processing apparatus according to claim 1, wherein the processing circuitry is configured to
compare the another part of the text information that has not yet been outputted by the speaker and the barge-in utterance,
identify a contradictory part between the another part of the text information that has not yet been outputted by the speaker and the barge-in utterance, and
control the display to highlight the contradictory part in the another part of the text information that has not yet been outputted by the speaker.

16. An information processing method executed in an information processing apparatus, the method comprising:
performing a speech synthesis process to change text information to speech information,
controlling a speaker of the information processing apparatus to output the speech information as system utterance,
receiving, via a microphone of the information processing apparatus, barge-in utterance, which is interruption utterance by a user,
in response to receiving the barge-in utterance while the system utterance is outputted by the speaker, starting, using processing circuitry, fade processing of lowering at least one of volume, a speech rate, or a pitch of the system utterance by controlling the speaker,
determining whether the at least one of the volume, the speech rate, or the pitch of the system utterance has become equal to or less than a predefined threshold by the fade processing, and
in response determining that the at least one of the volume, the speech rate, or the pitch of the system utterance has become equal to or less than the predefined threshold by the fade processing, controlling a display of the information processing apparatus to display the text information corresponding to the system utterance in such a manner to distinguish between a part of the text information that has been outputted by the speaker and another part of the text information that has not yet been outputted by the speaker, wherein
the method further comprises
comparing the text information and the barge-in utterance,
identifying a contradictory part between the text information and the barge-in utterance, and
controlling the display to highlight the contradictory part in the text information.

17. A non-transitory computer readable medium including executable instructions, which when executed by a computer cause the computer to execute an information processing method executed in an information processing apparatus, the method comprising:
performing a speech synthesis process to change text information to speech information,
controlling a speaker of the information processing apparatus to output the speech information as system utterance,
receiving, via a microphone of the information processing apparatus, barge-in utterance, which is interruption utterance by a user,
in response to receiving the barge-in utterance while the system utterance is outputted by the speaker, starting fade processing of lowering at least one of volume, a speech rate, or a pitch of the system utterance by controlling the speaker,
determining whether the at least one of the volume, the speech rate, or the pitch of the system utterance has become equal to or less than a predefined threshold by the fade processing, and
in response determining that the at least one of the volume, the speech rate, or the pitch of the system utterance has become equal to or less than the predefined threshold by the fade processing, controlling a display of the information processing apparatus to display the text information corresponding to the system utterance in such a manner to distinguish between a part of the text information that has been outputted by the speaker and another part of the text information that has not yet been outputted by the speaker, wherein
the method further comprises
comparing the text information and the barge-in utterance,
identifying a contradictory part between the text information and the barge-in utterance, and
controlling the display to highlight the contradictory part in the text information.

* * * * *